US008610650B2

(12) United States Patent
Somerville

(10) Patent No.: US 8,610,650 B2
(45) Date of Patent: Dec. 17, 2013

(54) ADVANCED MULTI LINE ADDRESSING

(75) Inventor: Alan Somerville, Tokyo (JP)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 563 days.

(21) Appl. No.: 12/454,625

(22) Filed: May 20, 2009

(65) Prior Publication Data

US 2010/0295760 A1 Nov. 25, 2010

(51) Int. Cl.

| | |
|---|---|
| ***G09G 3/32*** | (2006.01) |
| ***G09G 3/30*** | (2006.01) |
| ***G09G 5/10*** | (2006.01) |
| ***H04N 3/14*** | (2006.01) |
| ***H04N 5/335*** | (2011.01) |
| ***H04N 9/04*** | (2006.01) |
| ***G06K 9/46*** | (2006.01) |
| ***E04B 1/00*** | (2006.01) |

(52) U.S. Cl.

USPC ............... 345/82; 345/76; 345/690; 348/272; 382/240; 52/750

(58) Field of Classification Search

USPC ................. 345/1.3, 55, 76, 82, 690; 324/307; 426/231; 52/750; 382/114, 240, 265, 382/308, 232; 348/272

See application file for complete search history.

(56) References Cited

U.S. PATENT DOCUMENTS

| | | | | |
|---|---|---|---|---|
| 7,173,610 | B2 | 2/2007 | Paterson | |
| 2002/0057844 | A1 * | 5/2002 | Sirohey et al. | 382/240 |
| 2005/0200733 | A1 * | 9/2005 | Malvar | 348/272 |
| 2006/0107616 | A1 * | 5/2006 | Ratti et al. | 52/750 |
| 2007/0085779 | A1 * | 4/2007 | Smith et al. | 345/76 |
| 2008/0211793 | A1 | 9/2008 | Ku | |
| 2008/0291122 | A1 | 11/2008 | Smith et al. | |
| 2009/0195563 | A1 * | 8/2009 | Xu et al. | 345/690 |

FOREIGN PATENT DOCUMENTS

WO WO 2007079947 7/2007

OTHER PUBLICATIONS

Co-Pending U.S. Appl. No. 12/454,609, filed May 20, 2009, "Back to Back Pre-Charge Scheme," assigned to the same assignee as the present invention.

(Continued)

*Primary Examiner* — Quan-Zhen Wang
*Assistant Examiner* — Lin Li
(74) *Attorney, Agent, or Firm* — Saile Ackerman LLC; Stephen B. Ackerman

(57) ABSTRACT

A circuit for a flat panel display, capable of displaying images, is provided. The circuit includes an image storage and processing block for the images to be displayed, a display and timing controller block controlling the display operation, an image pixel matrix containing a multitude of rows and columns arranged pixel elements. The circuit also includes one or more controlled row driver blocks, one or more controlled column driver blocks, and a pixel display operation for displaying pixel elements employing an advanced multi line addressing operation applied to a row and/or column drive activated pixel element display operation. The advanced multi line addressing operation signifies that during every operating sequence a decomposition operation of image data is taking place by analyzing image data from multiple lines for common contents by pixel data comparison, separating common parts of the image data into a multi line data domain and residual parts of the image data into a single line data domain thus allowing for a display of these two data domains in separately activated pixel element display operations.

34 Claims, 13 Drawing Sheets

(56) References Cited

OTHER PUBLICATIONS

Co-Pending U.S. Appl. No. 12/455,554, filed Jun. 3, 2009, "Extended Multi Line Address Driving," assigned to the same assignee as the present invention.

Co-Pending U.S. Appl. No. 12/455,527, filed Jun. 3, 2009, "Tagged Multi Line Address Driving," assigned to the same assignee as the present invention.

* cited by examiner

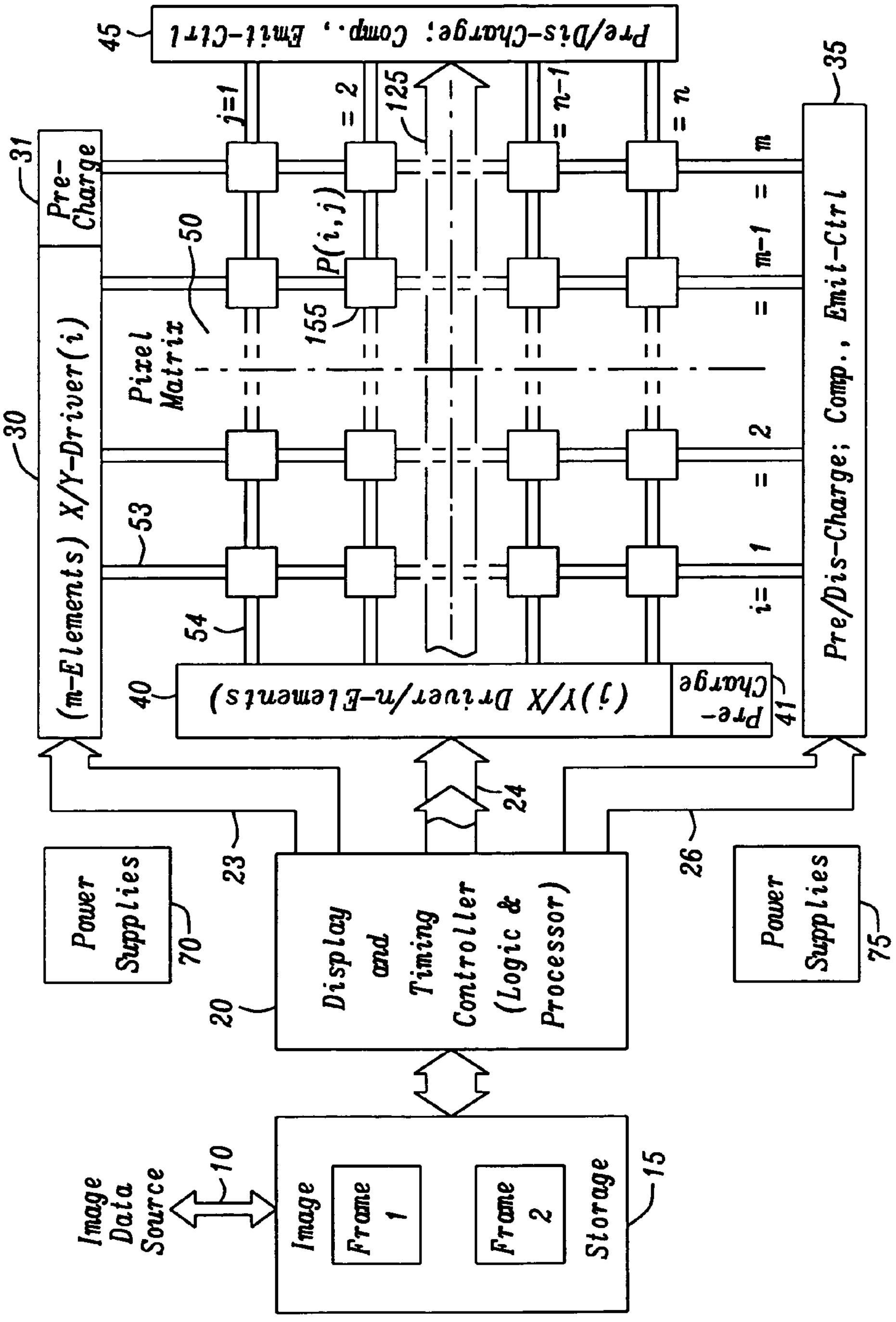
FIG. 1 – Prior Art

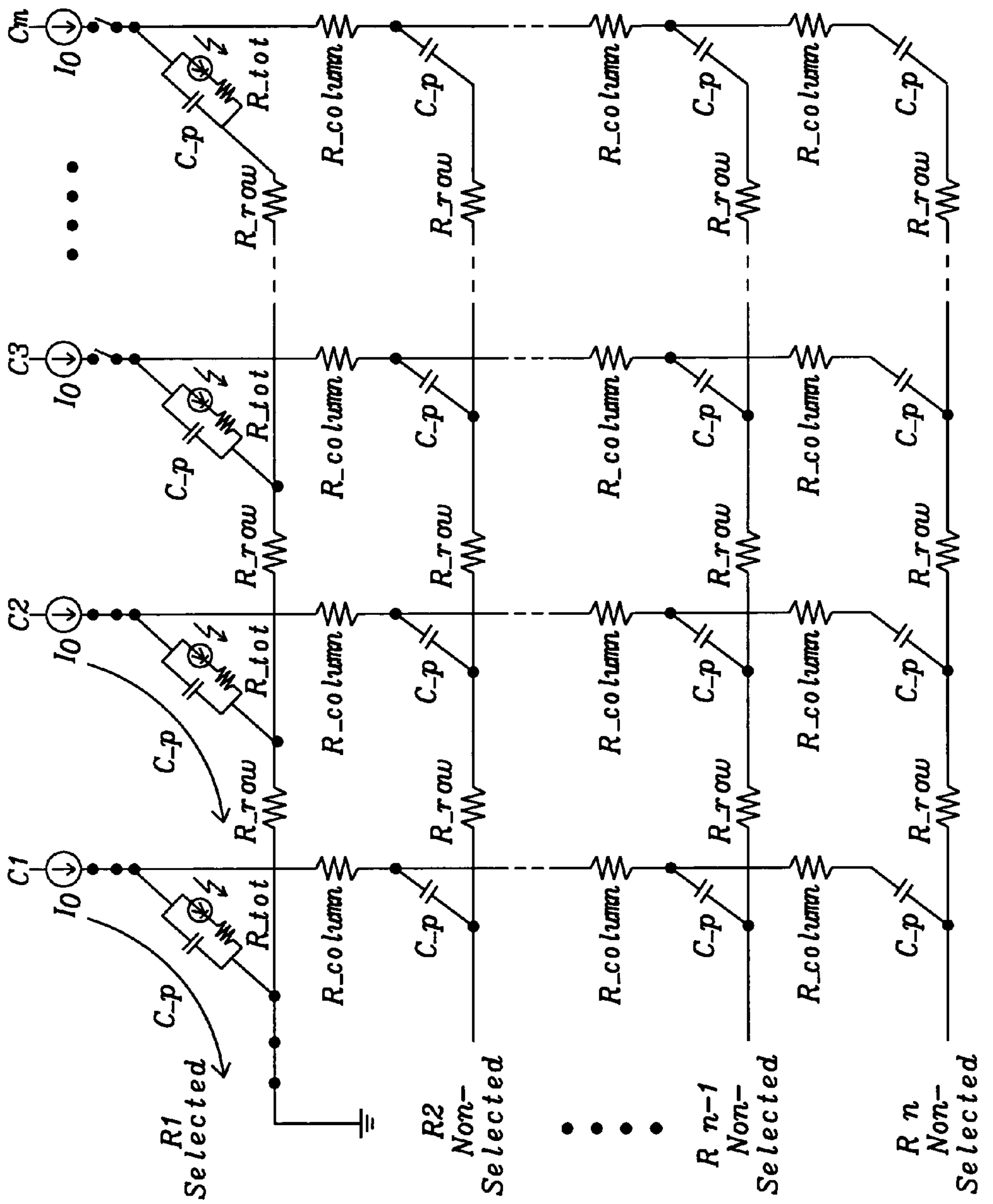
FIG. 2A - Prior Art

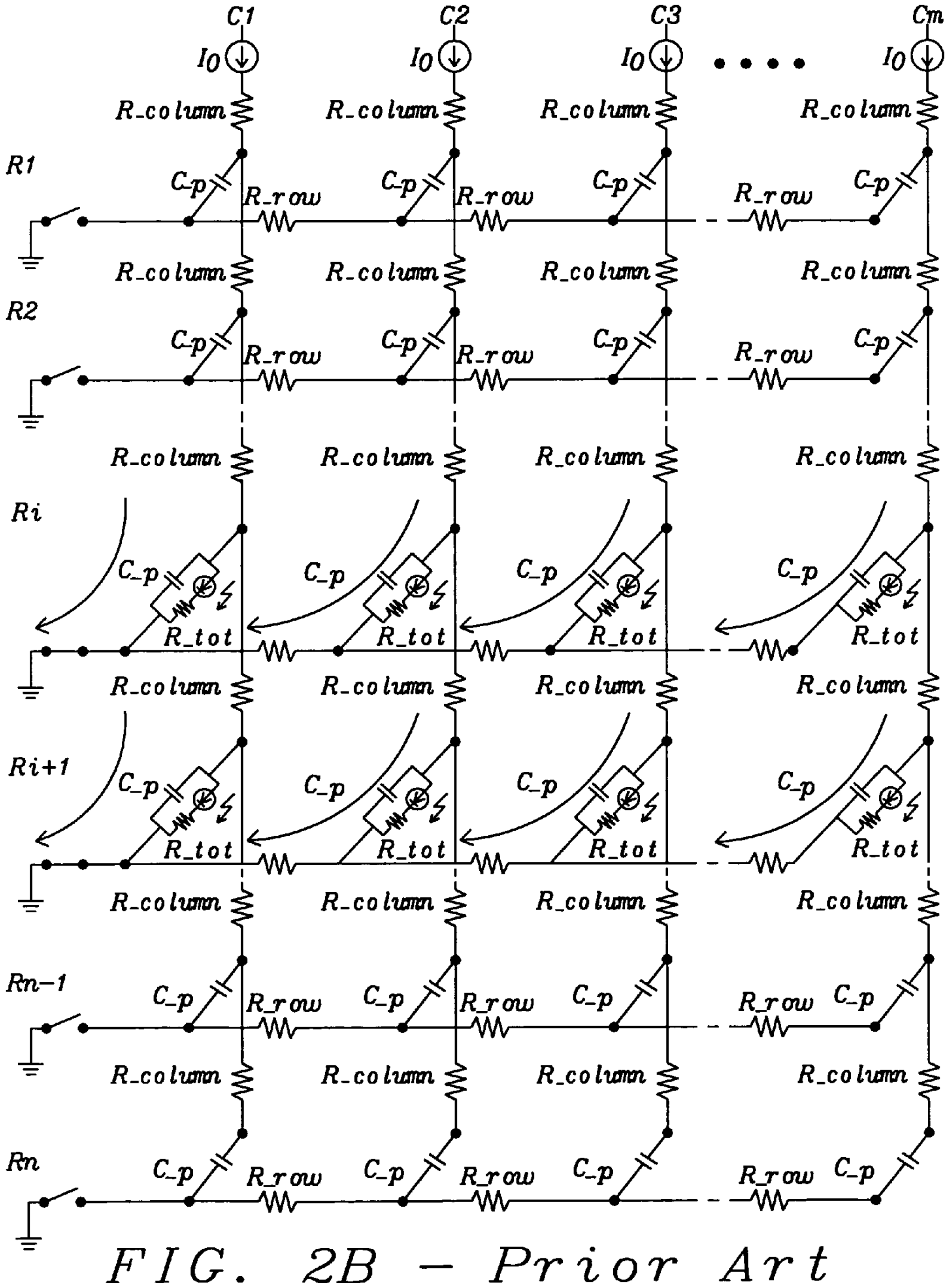
FIG. 2B - Prior Art

ADVANCED MULTI LINE ADDRESSING

RELATED APPLICATIONS

This application is related to the following US patent applications:

titled "Back to Back Pre-charge Scheme", Ser. No. 12/454,609, filing date May 20, 2009 titled "Extended Multi Line Address Driving", Ser. No. 12/455,554, filing date Jun. 3, 2009 titled "Tagged Multi Line Address Driving", Ser. No. 12/455,527, filing date Jun. 3, 2009

The contents of all three of these applications are hereby incorporated by reference in their entirety.

BACKGROUND OF THE INVENTION (1) Field of the Invention

The present invention relates in general to image display devices, display panels, and driving methods thereof implemented within display driver circuits, and particularly to the drive circuitry of matrix large-screen and high-resolution organic light-emitting diode (OLED) displays, especially circuits used in LED drivers manufactured as semiconductor integrated circuits. Even more particularly, this invention relates to a multi line address method saving calculations and processing power and optimizing performance as well.

(2) Description of the Prior Art

Electronic display devices are to date still from the LCD (Liquid Crystal Display) type fabricated in STN (Standard Twisted Nematic) or TFT (Thin Film Transistor) technology needing additional back-lighting but of late are more often also made as LED (Light Emitting Diode) displays in form of self-luminescent OLED (Organic LED) and PLED (Polymer LED also named as PolyLED) devices. Ever more such displays capable to exhibit their own luminosity without extra light sources are preferred. OLED technology incorporates organic luminescent materials that, when sandwiched between electrodes (anode, cathode) and subjected to a DC electric current, produce intense light of a variety of colors. Nearly the same is holding for PLED devices where polymer materials are used instead. Hence we will use in the following the terms OLED and PLED mostly in an exchangeable meaning. Similar capability can be achieved with Surface conduction Electron Emitter Displays (SEDs), High Dynamic Range (HDR) displays, Field Emission Displays (FED) and QDLED-Displays making use of Quantum Dot crystals. Currently OLED and PLED displays are commonly used, available in PMOLED (Passive Matrix) OLED and AMOLED (Active Matrix) OLED structure forms, differentiated by their driving methods and circuits. PMOLEDs are much simpler to manufacture than AMOLEDs because there is no TFT substrate for active components needed, and as a result fewer processing steps are required in the manufacturing line. OLED and PLED displays have several advantages compared to other display technologies: they are self-luminescing i.e. self-light-emitting not needing a backlight, do have high brightness and high luminance efficiency, exhibit short response times, a wide visual or viewing angle, a high contrast ratio, show a super-thin appearance (even flexible panel constructions are possible), they are power saving, offer a wide temperature tolerance, and so forth. OLEDs and PLEDs are also useful in a variety of applications as discrete light-emitting devices or as active elements for light-emitting arrays or displays, such as Flat-Panel Displays (FPD) of all kind and size. Depending on the types of substrates used for OLED and PLED manufacture, there are various types of implementations: Transparent OLEDs wherein transparent substrates for cathode and anode are used, which because of these transparent components can pass light in both directions and thus are especially useful in head-mounted display devices; Top-emitting OLEDs which use either opaque or reflective substrates, allowing light to be emitted in one direction only, and which are the most used types; Foldable OLEDs using highly flexible substrates, which help to reduce breakage of the display material thus allowing many new applications; and White OLEDs, used to emit white light which is brighter, more uniform and more energy efficient than other materials used for lighting.

The most obvious difference between PMOLED and AMOLED displays is the construction of their light-emitting elements or pixels. Such pixels of PMOLED devices are simply represented by the LED itself, created at the cross-overs of the dedicated conductive matrix wires. No additional storage or switching elements are included, only the capacitance of the LED itself determines the lighting dynamics. The PMOLED display device therefore requires a relatively high amount of power to operate in order to sustain a flicker free image. In addition, the display size of a PMOLED display device is limited by this matrix structure. The larger the matrix becomes the longer the wires get with an increase of their harmful properties, such as resitivity losses on wires and parasitic capacitances between lines responsible e.g. for perturbing crosstalk effects. Furthermore, as the number of conductive lines increases, the aperture ratio of PMOLED display devices decreases. In contrast, AMOLED display devices are highly efficient and can produce a high-quality image for a large display size with relatively low power. In general, in an AMOLED display device, a voltage controlling a current applied to the light-emitting element or pixel is stored in a storage capacitor. Accordingly, the voltage in the storage capacitor can be applied to the pixel until the next complete image content or frame is fed in and the pixel can continuously display the image during that one frame. As a result, an AMOLED device has a lower power consumption, with high resolution even at larger display sizes because it is able to display complete image frames with a constant brightness in spite of low driving currents, at the expense of additional switching elements for each pixel however, whereby the switch is usually implemented as Thin Film Transistor (TFT). PMOLED displays can therefore generally be manufactured at a lower cost than AMOLED displays.

Although the PMOLED display has a simple configuration and an advantage in terms of cost, the difficulty in realizing a display with large size and high brightness as well as low power consumption and high lifetime is limiting its use. Therefore, the AMOLED display in which the current flowing in a light-emitting element is controlled by one or more TFTs and the related voltage is stored by a capacitor where both components are disposed in each of the pixel circuits has its own preferred fields of application. An AMOLED display device has problems however in that variations in component characteristics of the pixel circuit may exist and thus brightness of each pixel which make up the display screen may vary.

As is well known for OLED and PLED displays, optimum performance especially with high-brightness LEDs is achieved only when the LEDs are driven by current sources rather than by voltage sources, the currents of which are delivered by individually controlled display drivers with highly precise current sources directly driving the LED pixels, whereby the LED element of each pixel itself is an electric component with diode characteristics including also parasitic resistances and capacitances.

In the PMOLED case no further components are needed to build the picture elements or pixels for the dots of the display matrix. A pixel, by definition, is therefore a single point or unit of an image, whereby its color is to be chosen, for color displays in a real-time programmable way. In monochrome displays a pixel only displays a single color whereby that color is not individually changeable, only for the display on the whole at production time. However in color displays, a pixel is capable to individually change its color and therefore has to include an arrangement of so-called sub-pixels, at least one sub-pixel for each of its elementary color components according to the color dispersion method chosen, as for both, PMOLED and AMOLED devices.

In the AMOLED case however the OLED sandwich structures are combined with electronic switches (transistors or diodes, especially Metal-Insulator-Metal (MIM) devices) and separate charge storing elements (capacitors) to form pixels that make up the dots of a modern matrix display. Dots for color displays therefore generally comprise more than one pixel, and thus are made up of sub-pixels emitting for example red, green, blue and of late also white light, which are individually controlled and driven. Various differently complex sub-pixel circuits have been developed making additional use of several TFT transistors and storage capacitors in order to overcome onerous side-effects of the intrinsic light emissive material of the pixels—such as degradation during lifetime, delayed response times for activation and deactivation of the pixel, and the like.

With reference to the more elaborate sub-pixel circuits for ON/OFF controlling the organic or polymeric light-emitting cell of each sub-pixel there are the already known two elementary driving methods for PMOLED and AMOLED displays, one is the Passive Matrix (PM) driving method and the other is the Active Matrix (AM) driving method using TFTs. In the PM driving method, anode and cathode electrodes are arranged perpendicular to each other to selectively drive the lines. On the other hand, in the AM driving method, TFTs and a charge storing capacitor are coupled to the pixel electrodes so as to sustain a voltage by the capacity of the capacitor. According to the form of the signals applied to the capacitor to sustain the voltage, the AM driving method can furthermore fundamentally be divided into a voltage programming mode and a current programming mode, whereby of late the current programming mode is preferred as already mentioned above. OLED displays are thus normally operated as current-controlled display devices. Nevertheless, for high-content displays realized as large matrix arrays, a multiplexing mode is also a necessity. In this context, though OLED devices are essentially current-controlled devices, a voltage drive mode is chosen for a short period before the current drive mode is established, which is operating as charge drive for the parasitic internal parallel capacitances of the OLED sub-pixel diodes. The electrical model of a sub-pixel of an OLED consists of a Light Emitting Diode (LED) and the parasitic capacitance modeled by a capacitor in parallel. A sub-pixel thus emits light when current passes through the diode. In a current driving system, the constant current source connects to the sub-pixel to turn it on. This charges up the capacitor linearly. Before the sub-pixel voltage reaches the diode's threshold or forward voltage, there is no current flowing through the diode and the sub-pixel is still OFF. Supply current is consumed only for charging the capacitor during this period. If the capacitance is large the sub-pixel is off for a long time. And it is ON only after the sub-pixel voltage has reached the threshold voltage level. These parasitic capacitances may become rather large depending on the size of the sub-pixel. The time of their charging-up until reaching the sub-pixel diode's threshold voltage is thus referred to as pre-charge period. Therefore, for a multiplexed matrix OLED display, both a current drive and a voltage drive are required. Because larger OLED displays exhibit these high capacitance characteristics, a normally substantial pre-charge current is injected voltage driven to bring the diode up to near its operating current prior to enabling the diode. Thus, time and power are not wasted for charging and discharging the relatively high capacitance that is inherent to large OLED display sub-pixels and the lifetime of the diodes are prolonged because the diodes are not required to swing the full voltage range during each cycle. Consequently having driven the OLED sub-pixel by pre-charging into the constant current driven and linear time function voltage rising region a Pulse Width Modulation (PWM) brightness control method for OLED sub-pixels is now feasible with high accuracy. The longer the constant current is applied, the brighter the OLED sub-pixel shines.

Performance problems with sub-pixel circuits have included degradation problems of the luminuous material; non-uniformity problems due to deviations of the threshold voltages of driving TFTs and its electron mobility; problems in securing the time for charging the load of the data lines since only small currents are used in controlling the OLED element, leading again to pre-charge method and circuit provisions; problems of current leakage through TFTs depending on neighbor pixel states, accordingly problems where images with desired gray levels are not displayed because of the current leakage; and problems with unnecessary power consumption since the current caused by pre-charge voltages is consecutively leaked into the pixel circuit while the pre-charge operation is not being performed. All this makes it understandable that rather sophisticated sub-pixel circuits in AM displays have evolved necessitating also rather elaborate control signal schemes for even multiple control signal lines for each sub-pixel. Modern display driver integrated circuit chips do contain all needed components for driving said such sub-pixel circuits, which are part of the OLED display matrix itself, however in the AM case only.

Generally the PM and AM OLED technology provide bright, vivid colors in high resolution and at wide viewing angles, additionally also exhibiting a high response speed in large but nevertheless slim FPD devices. OLED devices' technological advantages of high brightness and high luminance efficiency, short response time and wide visual angle, together with its power saving operation and wide temperature tolerance, have established unequaled features for large screens, offering high resolution displays with up to several million pixels and diagonal sizes up to 60 inches. However, OLED technology in very large-screen or huge-screen display applications is currently still on its way into the mass market; examples include huge time-table displays at train stations, in airports, or at harbors, or displays for large marketing advertisements and mass-public informational purposes including those displaying share prices in stock exchanges, and huge indoor or even outdoor stadium displays. OLED color displays are expected to offer substantial advantages compared to other technologies currently in common use: wide dynamic range of colors, high contrast, superior light intensity and lesser depending on various external environmental factors including ambient light, humidity, and temperature. For example, outdoor displays are required to produce more white color contrast under daylight conditions and during the night show more black color contrast. Accordingly, light output must be greater in bright sunlight and lower during darker, inclement weather conditions. The intensity of the light emission produced by an OLED pixel is directly proportional to the amount of current driving it. Therefore, the more light output needed, the more current has to be fed to the pixels which on the other hand is detrimental to the lifetime of the pixels.

Another important consideration in large-screen and huge-screen display applications using OLED technology is the pure physical size of the pixel. A larger area for the self-luminous emission area is more visible and lends itself to better achieving the required wide dynamic range of colors, contrast, and light intensity. However, a rather unrequested consequence of a larger pixel area is the relatively high inherent capacitance of the larger OLED pixel as compared to smaller OLED pixel structures. Due to this higher inherent capacitance, during pixel ON/OFF switching operations, an elevated amount of charge time is required to reach the correct OLED device working voltage. This augmented charge time thus limits the ON/OFF rate of the device and thus may adversely affect also overall display brightness and performance. Therefore a multitude of OLED pre-charge circuits and methods have been developed and integrated into existing FPD display driver circuitry to help overcome the detrimental effects of parasitic capacitance characteristics of OLEDs especially within large graphics FPDs.

FIG. 1 Prior Art now shows as circuit schematics the drawing for such an FPD, wherein a matrix display device converts electric signals processed by an information processing device into an image, visible on a FPD screen. Numerous circuits for complete FPDs exist as prior art in many variants, they shall be summarized here in form of an exemplary circuit shown as FIG. 1 Prior Art:

From FIG. 1 Prior Art can be recognized an Image Data Source 10 being connected via a bi-directional data bus and feeding its image data stream normally comprising a multitude of image frames into an Image Storage 15 unit, capable of storing multiple image frames, whereby every image frame contains in general successive image data from said incoming image data stream. That Image Storage 15 unit is again bi-directionally connected to a Display & Timing Controller 20 unit, comprising inter alia data and/or signal Logic circuits and data and/or signal processing units.

Display & Timing Controller 20 unit then prepares and conditions those image frame data as they come in from the Image Storage 15 unit, and delivers these data now in an appropriately transformed manner via image data and control signal bus systems 23, 24, 25, and 26 to the respective, closely display matrix adapted electronic driver units 30, 35, 40, and 45 of the FPD's literal Pixel Matrix 50. The Pixel Matrix 50 of the FPD includes a plurality of X-Lines 53 (i=1, 2 . . . m−1, m) extended along a first direction of an array substrate serving as material medium for the screen, a plurality of Y-Lines 54 (j=1, 2 . . . n−1, n) extended along a second direction of the array substrate that is substantially perpendicular to the first direction, and a plurality of sub-pixel 55 elements P(i, j) each electrically connected to one of the X-Lines and one of the Y-Lines. In this manner a Cartesian X-Y system of coordinates is established, mathematically spoken. From the terminology of mathematics here also the designations used are derived. Each i, j—indexed pair of X-Y coordinates thus uniquely identifies a sub-pixel element P(i, j) within 55. Many other terminologies in the context of FPD designations are in wide-spread use however, depending on the point of view (POV) taken in explaining the configuration. A possible interchange of the sequence X-Y into Y-X comes frome the fact, that the designation of the axes is freely interchangeable with its coordinated line designations, in case of a PM-structure these axes are even functionally interchangeable, because the construction of PMOLED pixels is fully symmetrical; besides polarity of the OLEDs only, where anode and cathode are interchanged which can easily be accounted for by inversely adapted voltage polarities however. Most closely related are the terms Rows and Columns for the Y/X- and X/Y-Lines respectively, which use directly the mathematical matrix designations for these parts. Using topological terminology leads to Horizontal and Vertical, which is mapped to Y/X- and X/Y-Lines again. From an FPD operational POV the Y- and X-Lines are called Scan-Lines and Data-Lines respectively, which is a rather often used terminology in fact. This operational POV sees an FPD as an image display device including Data-Lines for transmitting image data voltages representing the image signals, Scan-Lines for transmitting appropriate multiplex select signals scanning the matrix, with sub-pixel circuits for each image point coupled directly to those Data- and Scan-Lines. An even more technical aspect leads to the electrical POV valid however for AM-displays only, namely Gate-Lines and Source-Lines stemming from the utilized TFT-switching transistors in AM sub-pixel circuits. This electrical POV sees a Scan-Driver driving an AM-display device having a plurality of Gate-Lines transferring multiplex scan signals, and a Data-Driver driving a plurality of Source-Lines transferring image data signals. Also from the technical or electrical POV often in use for PM-displays are the terms Anode and Cathode, reminding directly of the OLED's diode function. Thus the designations Anode- and Cathode-Lines are used, as well as Anode- and Cathode-Drivers. All these designations are used in the case of the dynamic operation of multiplexed FPDs. There is however also a static, non-multiplexed operation possible, using fewer pixels only, then the Y/X- and X/Y-Lines are called Segment-Lines and Common-Lines or vice-versa, which becomes evident from the arrangements for simple displays, e.g. the commonly used 7-segment cipher displays. It is furthermore obvious that in case of a PMOLED display it is arbitrary which lines are labelled Row lines and which Column lines, Rows and Columns can be used interchangeably. From a methodological POV, the X/Y- and Y/X-terminology is avoided if not only strictly symmetrical issues are concerned, which is seldom the case, also for PM-arrays; the Row/Column or Scan/Data designations are easier to understand and remember, the Gate/Source naming is usable for AM-structures only, and even there it is not simply applicable any more because of the complex pixel-circuits with diodes as switching elements etc., the Anode/Cathode terminology is popular instead.

Consequently the display matrix adapted electronic driver units 30, 35, 40, and 45 bear the following names for unit 30: X/Y-Driver or Data-Driver or Source-Driver or Matrix-Column- or Horizontal-Drive-circuit which is driving the vertically running X/Y-Lines, Data-, Source-, or Column-Lines. Unit 40 correspondingly becomes designated as Y/X-Driver or Scan-Driver or Gate-Driver or Matrix-Row- or Vertical-Drive-circuit again now driving the horizontally running Y/X-Lines, Scan-, Gate-, or Row-Lines. Unit 35 is a possible coordinated driver circuit usually performing auxiliary functions such as pre-charge or discharge operations, compensation signal adding or secondary emit control functions for its attributed X/Y-Driver or Data-Driver or Source-Driver or Matrix-Column-circuit 30. In the same manner is unit 45 a possible coordinated driver circuit also performing auxiliary functions such as pre-charge or discharge operations, compensation signal adding or secondary emit control functions for its attributed Y/X-Driver or Scan-Driver or Gate-Driver or Matrix-Row-circuit 40. It shall especially be mentioned that all these functions may also be incorporated into the main driver circuits 30 and 40 as shown in FIG. 1 Prior Art for the corresponding pre-charge sections 31 and 41 respectively. From this can then be deduced that all the horizontally 54 and vertically 53 running data, select, scan, and control signals 53, 54 leading to their related sub-pixel circuits within 55 are possibly bundled in signal bus lines comprising multiple wires. Equally should be mentioned that the display matrix area may be separated into multiple sub-areas used for displaying only partial frames, so-called sub-frames, together with an appropriate adaptation of corresponding driver circuits and data and control signals. In order to be able to fulfill all the necessary tasks the mentioned display driver circuits or units 30, 35, 40, and 45 may contain needed sub components such as memory registers, shift-registers, switches, multiplexers, voltage level shifter circuits, programmable voltage and/or current sources and/or sinks, and additional clocks or timers. FIG. 1 Prior Art also unveils the existence of several power supplies 70 and 75 intended for generating and/or delivering various voltages and currents for being used as e.g. Row ON/OFF Voltage Source, Column ON/OFF Voltage Source, or as Column Compliance Voltage Source, or as Pre/Discharge Source, or the like. The generated voltages or currents are used for OLED pixel operations like applying the Pre-charge Pulse, setting Display Sub-pixel ON/OFF or accelerating the pixel OFF responses by injecting an extra Discharge Pulse. During a multiplexed image display operation the Scan/Row-Lines 54 are activated in sequence. When one of the Scan/Row-Lines 54 is activated, a data signal is applied to the selected sub-pixel elements in 55 through the Data/Column-Lines 53, so that the respective sub-pixel elements in 55 are electrically activated. When these selected sub-pixel elements in 55 are electrically activated, normally all additionally estimated necessary or needed auxiliary signals are appropriately synthesized defining the drive or data signals for all the sub-pixel elements in 55 thus correctly controlling the entire display pixel 55 made up of different sub-pixels. As a result, an optical activity is enabled to display the desired image. The time period during which first through last Scan/Row lines are activated is referred to as one frame, in the case only of regular single sequential scanning operations however.

With FIG. 2A Prior Art a more detailed view onto the Pixel Matrix 50 from FIG. 1 Prior Art of an FPD with PMOLED display matrix is depicted, schematizing the current driving functions of the Data/Column 30 drivers and the scanning operations of the Scan/Row drivers 40 by showing switched constant current sources as well as simple switches instead for each Column and Row respectively. The OLED pixels on the other hand are represented together with their parasitic elements total resistance R_tot and parallel capacitance C_p, just the same as the Row and Column wires with their loss resistances R_row and R_column. No other components are comprised in the passive matrix diode display array. As operating example is shown a state with Row R1 selected, i.e. its according switch is closed and Columns C1 and C2 are ON with all other Columns OFF, i.e. the related switches are closed only in the first two columns and thus only there currents can flow, and if the threshold voltages of the two switched ON diodes are surpassed after the parasitic capacitances of these two diodes are sufficiently charged-up, the OLED pixels (1,1) and (1,2) are shining bright. From this description and drawing the need for pre-charging OLED displays is easy to understand, if fast responses are required. The influence of all the other parasitic and lossy elements in PMOLED displays is also clearly illustrated.

Several different addressing schemes are used for individual addressing of the display pixels 55 of a display matrix, whereby in fact the addressing designates the selection or activation of single sub-pixels within a certain OLED pixel 55 dot. In general the individual sub-pixels in a matrix row are activated or selected by a Matrix Row signal formerly designated also as Scan/Row signals for a Row Select Time, whereas the image data to be displayed are supplied via individual Matrix Column or Data/Column signal lines. The most common addressing scheme formerly used mainly for LCD devices is the so called Alt & Pleshko driving scheme. Hereby each Matrix Row is activated separately. At the time the respective Matrix Row is selected or scanned the required image Data signals are applied to the Matrix Column via their Data/Column lines. So each display sub-pixel in the selected Matrix Row will show its programmed brightness as controlled by appropriate PWM Data signals as already explained farther above, which means each dot displays its correct color in case of color FPDs. After all dots within one Matrix Row have been completely activated, the next Matrix Row will be selected until all Matrix Rows of the display have been selected one time to display a complete image frame. Thereby, as already mentioned above a frame is defined as the time it takes to select all Matrix Rows of the FPD in case of Alt & Pleshko and thus driving every Matrix Row exactly once.

However, the PMOLED displays used in many modern applications encounter several common issues when the displays become larger and especially if they should also display video streams with moving pictures. These issues include sensible higher power consumption, thus an elevated operating temperature and, the larger they get a slower frame response with poorer contrast. A lifetime reduction becomes noticeable too, especially when PMOLED displays are frequently in use for displaying moving pictures at higher frame rates. In order to improve the quality of PMOLED displays, new driving methods using more evaluated addressing schemes are required. Simple addressing schemes did always address only single lines or rows of an FPD matrix at a time, applying ordinary multiplexing techniques. They are therefore subsumed and known as Single Line Addressing (SLA) techniques. More sophisticated addressing or driving schemes are the Multiple Line Addressing schemes (MLA), also known as Multiple Row Addressing (MRA). Groups of Matrix Lines or Rows are simultaneously driven and encoded image information is applied to Matrix Columns as Data/Column signals. The Data/Column voltage signal is now applied to the corresponding Matrix Column so that the corresponding OLED sub-pixels are all driven at the same time with image data.

FIG. 2B Prior Art shall now illustrate a simple MLA operation, looking back onto the already explained passive OLED pixel matrix from FIG. 2A Prior Art. Two lines are taken as example here, which are addressed together, namely Row Rj and Row Rj+1. The corresponding Scan/Row drivers are again replaced here by simple switches, which are closed if the lines are selected. The individual Data/Column drivers are represented however by controlled current sources, therefore no switches are needed here. As can be seen from the drawing, all the diodes within rows Rj and Rj+1 are connected to these controlled current sources and are therefore driven two in parallel in each column, that is in the example chosen here. From every Data/Column current source in MLA FPD driver circuits there is always the sum of currents drawn for all the OLEDs selected in multiple lines. Supplying all the diodes in the selected rows together at the same time thus always makes necessary exactly that same multiple of the current which would drive only one diode to the same brightness, the multiple according to the number of lines used in the MLA scheme. Additionally all the MLA schemes have to take into account the provisions to be made for needed pre-charging methods, which as a matter of course have also to be applied here, however considering the multiple demand of current just in the same way as for the Data/Column driving currents. What also can be understood easily from here, is the fact that all the OLEDs from each of the lines in an MLA scheme which are being driven simultaneously together can only receive identical contents, because of their identical Data/Column driving currents they receive.

Coming back now to PMOLED displays, where each Horizontal line is driven by a Row driving image Scan signal, and each Vertical line is driven by a Column driving image Data signal, it shall be recalled that the Row/Scan driver applies its Scan signal to one selected horizontal Row, while the Column/Data driver normally supplies all its image Data signals to all the vertical Column lines at the same time in conformity with the image Data content of the line being selected by the Row/Scan signal. Each pixel connected to its vertical Column line of the display now has power applied to it and is therefore illuminated. This driving mode is also designated as Single Line Addressing (SLA) mode. Having large numbers of vertical Column lines results in large currents to charge many OLED pixels at once. Therefore sometimes the exact points in time for the image Data supplied by the Column/Data driver are slightly delayed against each other, that is evenly distributed over the time slot available for the activation of the pixels of the whole row in order not to overly load the power supplies for the drivers. In other words, to create an image for every Row the Row/Scan signal is maintained as each of the Column lines is activated in turn until the complete Row has been addressed, and then the next Row is selected and the process repeated until all Rows are completed. Preferably is, however, to allow individual pixels to remain on for a longer time and hence reduce the overall drive level. The conventional method of varying pixel brightness is to vary the ON-time of each pixel using Pulse Width Modulation (PWM). In a conventional PWM scheme a pixel is either fully ON or completely OFF but the apparent brightness of a pixel varies because of an over the time integration within the observer's eyes. An alternative method is to vary the pixel driving current. Thus absolute current value and duration of the current flow for the driving Column/Data pulse can be played off against each other. Therefore current level can be lower if time is longer to obtain the same brightness impression. Thus usually one Row is selected and all the Columns are written in parallel despite of the summed-up current load this creates, that is a current is driven onto each of the Column lines simultaneously to illuminate each pixel in a Row to its desired brightness. The method mentioned above, where each pixel in a Column is being addressed in turn before the next Column is addressed is not often used because, inter alia, of the effect of column capacitance.

As already mentioned farther above it is usual practice to provide a current-controlled rather than a voltage-controlled Column/Data drive signal to an OLED because the brightness of an OLED is determined by the current flowing through the device, thus determining the number of generated photons. In a PMOLED matrix configuration the brightness can vary across the area of a display and also with operation time, temperature, and age, making it difficult to predict how bright a pixel will appear when driven by a voltage. Especially in color displays the accuracy of color representations may be affected. Another major challenge with using PMOLED in high resolution displays is that the operating lifetime is limited, as already adumbrated. The reason for this is that the current must be injected into each pixel diode within one horizontal line period, during which each row is selected. This means that as the resolution is increased a higher current must be injected into the pixel OLED over a shorter period of time in order to achieve the desired brightness. This high current accelerates the aging process that occurs inside the OLED, reducing the intensity of its light output over time. AMOLED displays do not have this limitation to the same degree, since the current can be injected during the whole vertical image frame period.

Many different MLA schemes exist. Modern MLA schemes have been further expanded and continuously developed into the Consecutive MLA (CMLA) scheme, a rather complex matrix decomposition method combining MLA and Single Line Addressing (SLA) techniques described in the WIPO Patent Application (WO/2007/079947 to Xu et al.) cited below, which however not in all cases delivers optimal solutions, sometimes even augmenting the number of necessary charging operations. Total Matrix Addressing (TMA) from U.S. Patent Application (2008/0291122 to Smith et al.) also cited below, despite and eventually because of its need of substantial processing power, is also not very satisfactory concerning overall efficiency in terms of power saving.

As can already be seen from the above the goal to both get the benefits of MLA schemes for FPD driving and at the same time limit the processing power requirements in favor of a low power consumption and augmented life-time of the whole FPD product is not easy to attain, a multitude of MLA schemes have been proposed with varying success given the surplus expenses needed.

A variety of solutions is found in the prior art for driving, controlling and addressing OLED displays in an attempt to simultaneously reach the two competing goals namely reaching high accuracy for OLED displays' brightness control and low power consumption and effectiveness in continuous operation. Nevertheless, additional improvements in both fields are desired and continued improvements in these areas are needed. It is therefore a challenge for the designer of such circuits to achieve an even higher accuracy in OLED pixel brightness control and also a more power economical solution which is also furnishing a better life-time. There are various patents referring to such solutions.

WIPO Patent Application (WO/2007/079947 to Xu et al.) teaches a method for triggering matrix displays, wherein matrix displays (D) are described which are composed of several rows that comprise individual pixels (ij) and are configured as lines (i) and columns (j). In said method, individual rows are selectively triggered by activating lines (i) for a certain line addressing time (ti), and the columns 0) are impinged upon by an operating current (I) or a corresponding voltage in correlation with the activated line (i) according to the desired brightness (Dij) in the pixels (ij). In order to increase the performance of the display, the line addressing time (ti) for each line (i) is defined in accordance with the maximum brightness of all columns (D).

U.S. Patent Application (2007/085779 to Smith et al.) discloses multi line addressing methods and apparatus, whereby the invention relates to methods and apparatus for driving emissive, in particular organic light emitting diodes (OLED) displays using multi line addressing (MLA) techniques. Embodiments of the invention are particularly suitable for use with so-called passive matrix OLED displays. A method of driving an emissive display, the display comprising a plurality of pixels each addressable by a row electrode and a column electrode, the method comprising: driving a plurality of said column electrodes with a first set of column drive signals; and driving two or more of said row electrodes with a first set of forward bias row drive signals at the same time as said column electrode driving with said column drive signals; then driving said plurality of column electrodes with a second and subsequent sets of column drive signals; and driving said two or more row electrodes with a second and subsequent sets of forward bias row drive signals at the same time as said column electrode driving with said second column drive signals.

U.S. Patent Application (2008/0291122 to Smith et al.) describes digital signal processing methods and apparatus, whereby the invention generally relates to methods, apparatus and computer program code processing digital data using non-negative matrix factorisation. A method of digitally processing data in a data array defining a target matrix (X) using non-negative matrix factorisation to determine a pair of matrices (F, G), a first matrix of said pair determining a set of features for representing said data, a second matrix of said pair determining weights of said features, such that a product of said first and second matrices approximates said target matrix, the method comprising: inputting said target matrix data (X); selecting a row of said one of said first and second matrices and a column of the other of said first and second matrices; determining a target contribution (R) of said selected row and column to said target matrix; determining, subject to a non-negativity constraint, updated values for said selected row and column from said target contribution; and repeating said selecting and determining for the other rows and columns of said first and second matrices until all said rows and columns have been updated.

U.S. Pat. No. (7,173,610 to Paterson, Kenneth Graham) describes a decoder system capable of performing a plural-stage process, comprising a decoding system which is arranged to perform a plural-stage process in determining which of the driver lines to stimulate in response to each electrode address value supplied to the decoder. This enables the network configuration of the impedances to be machine generated, and also enables the decoder to calculate on the fly which driver lines to stimulate in response to each address value. Furthermore, different resolutions may be provided to enable groups of the electrodes to be addressed simultaneously. Such a decoder arrangement may also be used with an electrode arrangement in which each electrode is connected to only two of the driver lines, in order to achieve addressing schemes in which up to t consecutive electrodes can be driven simultaneously. The invention is applicable, for example, to liquid crystal displays, arrays of memory elements and arrays of sensors such as light-sensors.

Studying both MLA methods mentioned above, TMA and CMLA, they are disclosing substantial technically and mathematically different ways of working. TMA is based on a non-negative matrix factorization using an iterative method to approximate the original image by a product of two non-negative matrices, and TMA therefore involves complex processing of the whole image along with driver circuits using well matched current sources and sinks for both anodes and cathodes of the OLEDs whereas CMLA tries a lossless decomposition of the image data matrix into a sum of consecutive multi line matrices by a combinatorial algorithm, i.e. computed only by adding, substracting and comparing operations also using sequences of iterations, whereby at least three are needed, although simpler to implement than TMA it does nevertheless require significant processing of the image in order to minimize the peak currents for the OLED drivers.

In the prior art, there are different technical approaches to achieve the goal of implementing modern MLA schemes for FPD driving with limited processing power requirements in favor of a low power consumption and augmented life-time realized as integrated circuits. However these approaches use often solutions, which are somewhat technically complex and therefore also expensive in production. It would therefore be advantageous to reduce the expenses in both areas.

SUMMARY OF THE INVENTION

A principal object of the present invention is to realize a system for an FPD with a very economic multi line addressing scheme for OLED displays and essentially reduced complexity.

Another principal object of the present invention is to provide an effective and very manufacturable method for displaying OLED pixels with reduced power consumption implemented as an FPD driver integrated circuit (IC) for MOSFET technology.

A further principal object of the present invention is to allow a simpler multi line addressing scheme for OLED displays to be used without degrading its basic performance on FPD quality.

Another further principal object of the present invention is to reduce the number of pre-charge operations for driving the OLED pixels.

Another object of the present invention is to realize a system for an FPD with low power consumption.

Further another object of the present invention is to give a method for reducing the operating temperature of FPD drivers.

Still another object of the present invention is to give a method whereby the lifetime expectations for FPD devices are enhanced.

Another still further object of the present invention is to use a simpler design for FPD drivers.

Still another object of the present invention is to simplify the design of the power supplies within FPD driver circuits.

Also still another object of the present invention is to simplify the production of FPD devices.

Further a still other object of the present invention is to make better use of battery power resources in portable devices using FPDs.

Another further object of the present invention is to allow for an economically manufacture of very large FPD devices.

These objects are achieved by a new circuit capable of realizing a flat panel display capable to display images, comprising an image storage and processing block for storing and processing said images to be displayed; a display and timing controller block controlling said display operation; an image pixel matrix containing a multitude of row- and column-line arranged pixel elements; one or more controlled row driver blocks; one or more controlled column driver blocks; and a pixel display operation for displaying said pixel elements employing an advanced multi line addressing operation applied to a row and/or column drive activated pixel element display operation, whereby said advanced multi line addressing operation signifies that during every operating sequence a decomposition operation of image data is taking place by analyzing image data from multiple lines for common contents by pixel data comparison, separating common parts of the image data into a multi line data domain and residual parts of the image data into a single line data domain thus allowing for a display of these two data domains in separately activated pixel element display operations.

In accordance with the objects of this invention the new circuit is described more generally by a circuit realizing a flat panel display capable to display images, comprising an image storage and processing means; a display and timing controller means; an image displaying means containing a multitude of row- and column-line arranged pixel elements; one or more row controlling means; one or more column controlling means; and a pixel display operation for displaying said pixel elements employing an advanced multi line addressing operation applied to a row and/or column drive activated pixel element display operation, whereby said advanced multi line addressing operation signifies that during every operating sequence a decomposition operation of image data is taking place by analyzing image data from multiple lines for common contents by pixel data comparison, separating common parts of the image data into a multi line data domain and residual parts of the image data into a single line data domain thus allowing for a display of the two data domains in separately activated pixel element display operations.

Also in accordance with the objects of this invention a new method is described, capable of implementing a power saving advanced multi line addressing algorithm for flat panel display drivers, comprising: providing a flat panel display device with a plurality of selectively activatable pixel elements arranged in an array of orthogonally oriented rows and columns capable to display image data frames; providing according image data storage and processing means as well as display and timing controlling means; providing according row and column driver circuits for the selectively activatable pixel elements; fetching at least two lines of an original image data frame from the image data storage and processing means for appropriate advanced multi line addressing algorithm operations employing more than one line of the image data; decomposing the fetched lines of image data into multi line domain and single line domain data in such a way, that multiple lines are compared pairwise to each other in order to find their common contents which then is outputted as image data into related lines of the multiple line domain, these lines being commonly identical to all the currently compared lines thus forming a group of lines all with identical image data whereas the left over residual data of each compared pair of the multiple lines currently compared are singled out into accordingly related single lines in the single line domain data with singly individual image data; whereby these comparing prescriptions above define the core of the advanced multi line addressing algorithm; preparing the data from the multi line domain and the data from the single line domain in such a way that two frames of image data are saved into distinct multi line and single line domain frames according to the output of the decomposition in step 'decomposing' above by looping back to step 'fetching' above until all image data lines of the original image data frame are processed according to the multi line addressing algorithm; scanning sequentially the selectable display pixel elements of the array by selecting groupwise all the rows from the multi line domain frame groups with identical common contents thus activating all row/scan drivers for the accordingly selected rows from each currently selected group of the frame; driving for all selected rows of a certain active group with identical common contents from the multi line domain frame all the selected display pixel elements for every column sequentially or at the same time whilst activated by the current scan operation with the identical image data from the currently active group in the multi line domain thus activating collectively all column/data drivers for the accordingly selected columns from each active group; scanning sequentially the selectable display pixel elements of the array by selecting every single line with singly individual image data from the single line domain frame thus sequentially activating row by row all the row/scan drivers for each row of the frame; driving for all selected active rows with singly individual image data from the single line domain frame all the selected display pixel elements for every column sequentially or at the same time whilst activated by the current scan operation with the singly individual image data from the single line domain thus activating collectively all column/data drivers for the accordingly selected columns for each active row; and repeating all the 'scanning' and 'driving' steps above continuously until all group of lines all with identical image data from the multi line domain and all singly individual image data from the single line domain are being operated upon whereby its order is arbitrary.

Finally in accordance with the objects of this invention the method is described again more generally, capable of implementing a method for implementing an advanced multi line addressing algorithm for flat panel displays comprising: providing an image displaying means containing a multitude of in pixel rows and pixel columns arranged pixel elements capable of displaying image data in form of image data frames; providing an image storage and processing means capable to implement uniquely advanced multi line addressing algorithm related parts regarding storing and processing calculations of the image data frames; providing a display and timing controller means capable to implement uniquely advanced multi line addressing algorithm related parts regarding synchronous and sequential control and drive operations on the image data frames; providing one or more pixel row controlling means capable to scan display pixels according to the uniquely advanced multi line addressing algorithm related prescriptions; providing one or more pixel column controlling means capable to drive display pixels according to the uniquely advanced multi line addressing algorithm related prescriptions; establishing as advanced multi line addressing algorithm a sequentially operating multi line addressing mechanism for addressing and driving the pixel elements by the pixel row and column controlling means in such a way that a decomposition of the image data into multi line domain and single line domain data takes place, whereby multiple lines of image data frames are compared pairwise to each other in order to find their common contents; determining as first part of the advanced multi line addressing algorithm the common contents of multiple image data lines by comparing pixelwise two lines of image data whereby the common contents from each compared pair of pixels is then outputted as identical image data from both of these compared lines into the related pixels in the related lines of the multiple line domain; identifying as second part of the advanced multi line addressing algorithm the left over residual data of each currently compared pair of the multiple image data lines as individual contents singled out into accordingly related single lines of the single line domain with singly individual image data in such a way that if both image data of the compared pixels in the currently compared lines are identical the resulting single line image data for the related pixels are both zero, if the image data of the compared pixels are different one single line image datum contains that positive difference whereas the other contains zero as image data in the related pixels of the related single lines of the single line domain; continuing as third part of the advanced multi line addressing algorithm the comparing and identifying for the next pair of lines of image data by looping back to step 'determining' above until all lines of the currently processed image data frame are being operated upon, thus creating groups of lines each with identical image data in the multi line domain if lines are identical to all the lines compared before and accordingly generating the related single lines with individual image data in the single line domain; operating the row driver circuits as multiplexed scan drivers capable to select one or more rows of display pixels and operate the column driver circuits as image data drivers capable to drive one or more columns of display pixels for one or more rows, both sequentially or at the same time according to the prescriptions of the advanced multi line addressing algorithm; displaying sequentially all the groups of common image data from the multi line domain in a groupwise synchronously pixel element data display operation for every pixel element in each column during an all the multiple rows of the group comprising sequence of pixel driving activations for the current frame; and displaying sequentially the individual image data from every line in the single line domain in a pixel element data display operation for every pixel element in each column during the single row oriented sequence of pixel activations for the current frame.

BRIEF DESCRIPTION OF THE DRAWINGS

In the accompanying drawings forming a material part of this description, the details describing a typical embodiment of the invention are shown:

FIG. 1 Prior Art exhibits the electrical schematics of a typical display driver and control circuit complete with OLED pixel array or matrix having model character as an exemplary embodiment for an FPD according to this invention proposing a new multi line addressing technique.

FIG. 2A Prior Art demonstrates the operation of a passive matrix circuit in a schematized way, however considering OLEDs with parasitic elements and matrix structures with losses.

FIG. 2B Prior Art illustrates the operation of MLA schemes within a passive matrix OLED circuit comparable to the schematics of FIG. 2A Prior Art.

DESCRIPTION OF THE PREFERRED EMBODIMENTS

Figure 3A:
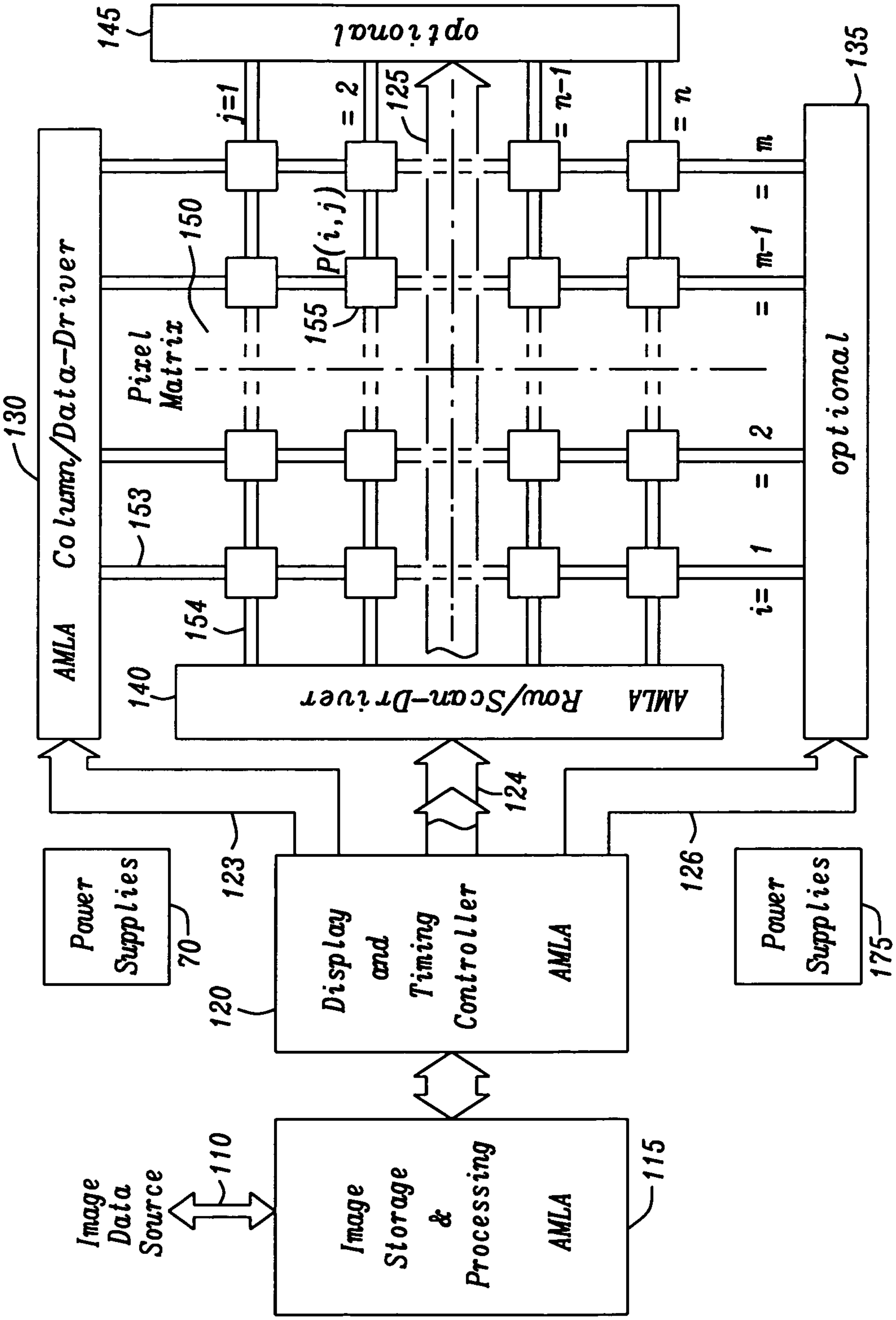
FIG. 3A illustrates by the help of modified electrical schematics an exemplary embodiment for a new FPD device incorporating new units and new driver circuits employing the new 'Advanced Multi Line Addressing' (AMLA) scheme according to this invention proposing a new simplified calculation technique.

The preferred embodiments disclose novel realizations for display controller and driver circuits for FPDs solving the problem of inherent high power consumption of OLED displays and unwanted elevated power consumption by additional MLA scheme calculation operations and are described here by one exemplary showcase circuit of an FPD and especially by a new method of operation according to this invention. The higher the resolution of an FPD with a certain size, the more lines, i.e. rows and columns does it contain. Inherent high power consumption of higher resolution (high-res) OLED displays, especially troublesome for PM types, but to a lesser extent also found within AM types, not only reduces the operating time of portable, battery powered appliances but also reduces the lifetime of OLED displays by heating up the OLED pixel diodes. The reason for this is that in conventional SLA modes the full luminance driving current must be injected into each OLED pixel diode within only one time period for one horizontal line scan, the time during which each of the rows is selected. The more rows there are to be scanned during one frame period the lesser time is left over for one row, because the repetition rate for the frames has to remain always the same, determined by the human eyes' ability to integrate an image as a whole from the scanned lines and thus constantly leaving only $1/60$ sec (or $1/50$ sec; usually corresponding to the frequency of the mains supply) time for writing all rows, calculated from repetition rates of 60 (50) images per second, where 25 images per second is the lowest recommended rate, in order to get a stable visual impression without flicker. If dual scan techniques (used mainly in LCD or AMOLED displays) are used, this alleviates to doubled durations ($1/30$ or $1/25$ secs), but only every other line is written then. This means that as the resolution is increased a higher current must be injected into the OLED pixel diode over a shorter period of time in order to achieve the desired brightness; the visually perceived brightness from an OLED being a product of supplied current value and time applied. High currents are however accelerating the aging process that occurs inside the OLEDs caused by higher temperature due to diode losses, thus reducing the intensity of their light output over time. Additionally higher currents and higher voltages owing to drive more rows and columns of high-res displays also mean higher resistive and capacitive losses as a result of longer and smaller wires and fewer empty space left for such displays, having the same dimensions otherwise. Thus the importance of successful MLA schemes can not be overemphasized.

From the above it is rather evident that a multitude of controversial issues and dependent facts—chosen from an individual technically solution—are influencing each other in such a way, that there still is room for advances especially in driving and addressing algorithms and circuits. Several other aspects are also taken care of in forming the Column/Data driver signals, so as there should not be any residual DC-offset voltage left when integrated over operation time of the FPD, because of obnoxious material degradation effects in each OLED pixel e.g. caused by electromigration, thus also limiting lifetime. On the other hand, if all the vertical Column/Data lines could be driven at one time, this could also be an option for the horizontal Row/Scan lines, which is what MLA/MRA schemes propose, namely to select more than one Line or Row at the same time. Extending this to its limits ends up at the final matrix addressing scheme, the particular case where all Row/Scan lines are selected at the same time, which is also known as Total Matrix Addressing (TMA) scheme. In order to better understand the reasons behind the increasing application and implementation of MLA schemes in FPD driver circuits, an overview of their advantages and drawbacks shall be given here.

The advantages of MLA schemes include:

- Lower resulting driving voltages (mainly LCD/LED) and/or peak currents (LED) as compared to SLA drive schemes.
- Power saving due to more economical numbers and ways of driving and charging processes.
- Better contrast and reduced display cross-talk issues thus improved display quality.
- Faster frame response time, no motion blur—thus suitable for faster response FPD devices for video and animation display, although response times for OLEDs are already significantly better as for LCD devices.

Reduction of the Frame Response Effect, which can be noticeable especially in PMOLED devices.

Other possible advantages can be reached by applying sub-frame algorithms and multiple scan procedures.

As main drawback the high requirements for display data processing have to be called first, especially for large displays. MLA calculations can generally be represented by matrix operations, accounting for various aspects in image contents, such as patterns, stochastic distributions etc.; other ancillary aspects of technical nature such as the resulting driving waveforms, the resulting voltage levels and the driving power reduction are also incorporated into the reasonings and can make the mathematical theories complicated and in consequence their processing really heavy. In order to simplify hardware implementation, various algorithms are proposed and evaluated, but as a rule of thumb may be regarded: the more lines are to be included into the calculations (up to TMA schemes) and the more ancillary conditions are considered the more demanding the processing of the proposed solutions becomes. High processing requirements however ask for fast processors and large memories, thus processing power may constitute another possible drawback of MLA schemes to be considered.

As already explained above there is a large variety of circuits usable for FPDs and their driver circuits. They all have in common that they comprise some standard components in varying configurations such as an Image Storage and Processing block, a Display & Timing Controller block, a Pixel Matrix normally set-up as a rectangular X-Y array of equally spaced OLED Pixels forming the display screen area together with their needed corresponding X/Y-Driver and Y/X-Driver circuits as shown in FIG. 1 Prior Art above. Various means for Power Supply are also included as shown. The technical approach to achieve the goal of avoiding most of the disadvantages with known FPD driver circuits is lowering the power consumption of an FPD and its current and voltage demands during image display operations whereby the needed computations and OLED pixel driving actions are effectively reduced introducing the 'Advanced Multi Line Addressing' (AMLA) scheme according to this invention. Using the intrinsic advantages of that solution—as described later on in every detail—the construction of the circuits and the method for using these circuits according to the invention as realized with standard MOS technology is described and explained.

Contemplating now FIG. 3A, the AMLA modified electrical schematics exemplifying an FPD device according to this invention are depicted, wherefrom can be recognized an Image Data Source 110 being connected via a bi-directional data bus and feeding its image data stream normally comprising a multitude of image frames into an AMLA Image Storage & Processor 115 unit, capable of storing at least one image frame, whereby every image frame contains in general successive image data from said incoming image data stream. That AMLA Image Storage & Processor 115 unit is again bi-directionally connected to an AMLA Display & Timing Controller 120 unit, comprising inter alia data and/or signal Logic circuits and data and/or signal Processor capabilities, whereby all Processor units may be implemented e.g. in form of a Digital Signal Processor (DSP) and/or any other general purpose Processor with Central Processing Unit (CPU) and normal Random Access Memory (RAM) and/or Read Only Memory (ROM) modules or even additionally equipped with special Electrical Programmable (EP)-ROM or other One Time Programming (OTP) memory modules. As Processor may also be understood every other device capable to resolve the required processing tasks like finite state machines, logical networks and sequencers, or other dedicated hardware such as ASIC (Application Specific Integrated Circuit) or FPGA (Field Programmable Gate Array) devices and timers. The AMLA Display & Timing Controller 120 unit is then preparing and conditioning those image frame data as they come in from the Image Storage 115 unit and is delivering these data now in an appropriately transformed manner via image data and control signal bus systems 123, 124, 125, and 126 to the respective, closely display matrix adapted electronic AMLA driver units 130, 135, 140, and 145 of the FPD's literal Pixel Matrix 150 (of size m×n). Said Pixel Matrix 150 of the FPD includes a plurality of X-Lines 153 (i=1, 2 . . . m−1, m) extended along a first direction of an array substrate serving as material medium for the screen, a plurality of Y-Lines 154 (j=1, 2 . . . n−1, n) extended along a second direction of the array substrate that is substantially perpendicular to the first direction, and a plurality of pixel or sub-pixel 155 elements P(i, j) each electrically connected to one of the X-Lines and one of the Y-Lines. In this manner a Cartesian X-Y system of coordinates is established, thus making up the OLED screen area of size (m×n). As far as the AMLA driver units 130, 135, 140, and 145 are concerned, these must be capable to implement AMLA specific requirements, such as to drive multiple Scan Rows 140 at the same time, therefore named here AMLA Row/Scan-Driver 140 and as corresponding Column/Data-Driver 130 being able to modulate the driven pixel or sub-pixel currents and PWM image data according to AMLA results and therefore designated here as AMLA Column/Data-Driver 130. Additional functions like pre-charging and dis-charging OLED pixels may also be implemented by these drivers. It shall also be mentioned that driver circuits 135 and 145 together with their data busses 125 and 126 may be optional. From this can then be deduced that all the horizontally 154 and vertically 153 running data, select, scan, and control signals 153, 154 leading to their related sub-pixel circuits within 155 are possibly bundled in signal bus lines comprising multiple wires. Equally should be mentioned that the display matrix area may be separated into multiple sub-areas used for displaying only partial frames, so-called sub-frames, together with an appropriate adaptation of the MLA algorithms, the corresponding driver circuits as well as data and control signals. In order to being able to fulfill all the necessary tasks the mentioned display driver circuits or units 130, 135, 140, and 145 may also contain needed sub components such as memory registers, shift-registers, switches, multiplexers, voltage level shifter circuits, programmable voltage and/or current sources and/or sinks, and additional clocks or timers. Especially also pixel and sub-pixel pre-charge facilities shall be counted in here.

Introducing the 'Advanced Multi Line Addressing' (AMLA) scheme into this FPD circuit reduces the peak currents of the OLEDs by driving more than one display row at a time. AMLA operates in a similar way as the CMLA algorithm does, in that display rows are normally processed in two adjacent lines and output is created over more than one image frame-output thus fed into an M matrix which contains the common elements for more than one line or the Multi lines or M-domain and output fed into an S matrix which contains the residual data for Single lines, the Single lines or S-domain. In particular with AMLA, each image or video frame is decomposed into only two sub-frames, therefore only one frame of image data is needed for processing, which means data storage and memory requirements are minimized. The final goal is therefore to decompose the image data into two sub-frames, one within the M-domain, the other within the S-domain, the overlay (addition) of which is then equal to the original image. The AMLA algorithm according to this invention now does this decomposition in a simplified manner, namely by maximizing the Multi line data in the M-domain and minimizing the Single line data in the S-domain, which is achieved by outputting all the common parts of line data for each number of pixels compared in the analyzed rows into the Multi line M-domain sub-frame and keeping only the residual parts of single line data in the Single line S-domain sub-frame. As can be deduced from this description these algorithms are sufficiently simple and easy to implement. Moreover, the chosen algorithms do not suffer from numerical instabilities, just computing a lossless decomposition giving a solution in real-time, i.e. within one image frame period. Which one of these calculated sub-frames is then displayed first is depending from experience, can be also used as degree of freedom in the MLA algorithms. Thus the designation first and second in the following does not imply its real ordering.

During the first of these sub-frames the rows are driven two or more at a time with the same data delivered by the M matrix from the multi line domain. Driving OLED column pixels for two or more rows using MLA schemes in PMOLED structures only with columnwise identical image data is a prerequisite: all column drivers (controllable current sources) can only feed the same currents to their selected diodes i.e. to the diodes connected to their respective column wires, (in AMOLED devices there are additional actions and provisions for columns thinkable, removing this prescript). That is in PMOLED arrays, a lower OLED peak current applied to each diode is made possible over the longer summed up period of time, now available for that whole number of selected two or more rows currently in scanning mode, where all OLED pixels in each column receive the same image data or OLED currents to generate the according luminosities. Lowering the peak amplitudes of the currents flowing over a longer time by MLA methods and thus reaching the same brightness from the shining OLEDs as in SLA cases with higher amplitude currents in shorter periods means lowering power consumption because of the quadratic laws for current i(t) or voltage u(t) within the formula for electric power: $p(t) \rightarrow u(t)i(t)\,dt \rightarrow i(t)^2R\,dt \rightarrow$ or $u(t)^2/R\,dt$, all to be integrated over time t to get the total power consumption. A first subframe with M matrix data is thus written completely in multi line mode, although M and S planes can be interleaved, and should preferably contain the essential bright shining parts of the image, because generating high intensity OLED pixels in multi line mode allows for driving these image pixels with lowered amplitude currents at longer driving periods. Power savings are thus maximized. Parts of the image data representing high luminance parts are therefore preferably to be found in the M domain, which inter alia characterizes the AMLA decomposition method.

During the second sub-frame (that other remaining sub-frame from the two to be processed within the AMLA method) only 'corrective' data from the S matrix is added to each row stemming exclusively from said single line domain, on order to give each pixel its individual color and brightness. Preferably herein only minor intensities should have to be displayed, therefore also only demanding for lower peak currents to drive, writing only minor OLED pixel intensity corrections (positive only) corresponding to rather dark pixels if they would be displayed separately.

The driving of the two sub-frames or planes, corresponding to the pixel data in matrices M and S, which is normally done sequentially in such a way that images corresponding to plane M are displayed, then followed by those for plane S or vice-versa and so on, can also be interleaved in various ways to make uses of precharge saving methods, such as the "Back to Back Pre-Charge Scheme" of the inventors described elsewhere.

Using the AMLA algorithm there is a decisive simplification compared to CMLA: instead of searching for the maximum reduction in OLED driver peak current as CMLA requires as target function, the AMLA algorithm is simplified so as to maximize the multi line data M and minimize the single line data S, this is achieved by outputting all the common line data in the multi line domain M and keeping only the residual single line data in the single line domain S. This is a vast simplification of the algorithm and means that processing can be accomplished in a shorter time with less circuitry. AMLA is thus the first scheme performing the necessary calculations in a cost effective manner suitable for application to very power economic devices. Other schemes require intensive computations that require significant processing power which consumes unwanted high electric power and also adds more design complexity.

To bear in mind: qualifying the circuit from FIG. 3A above for AMLA requires that especially the units 115 and 120, as well as drivers 130 and 140 are tailored for implementing the AMLA algorithm, therefore deserving the designations AMLA Image Storage & Processor 115 unit, AMLA Display & Timing Controller 120 unit, AMLA Column/Data-Driver 130, and AMLA Row/Scan-Driver 140 circuits.

Figure 3B:
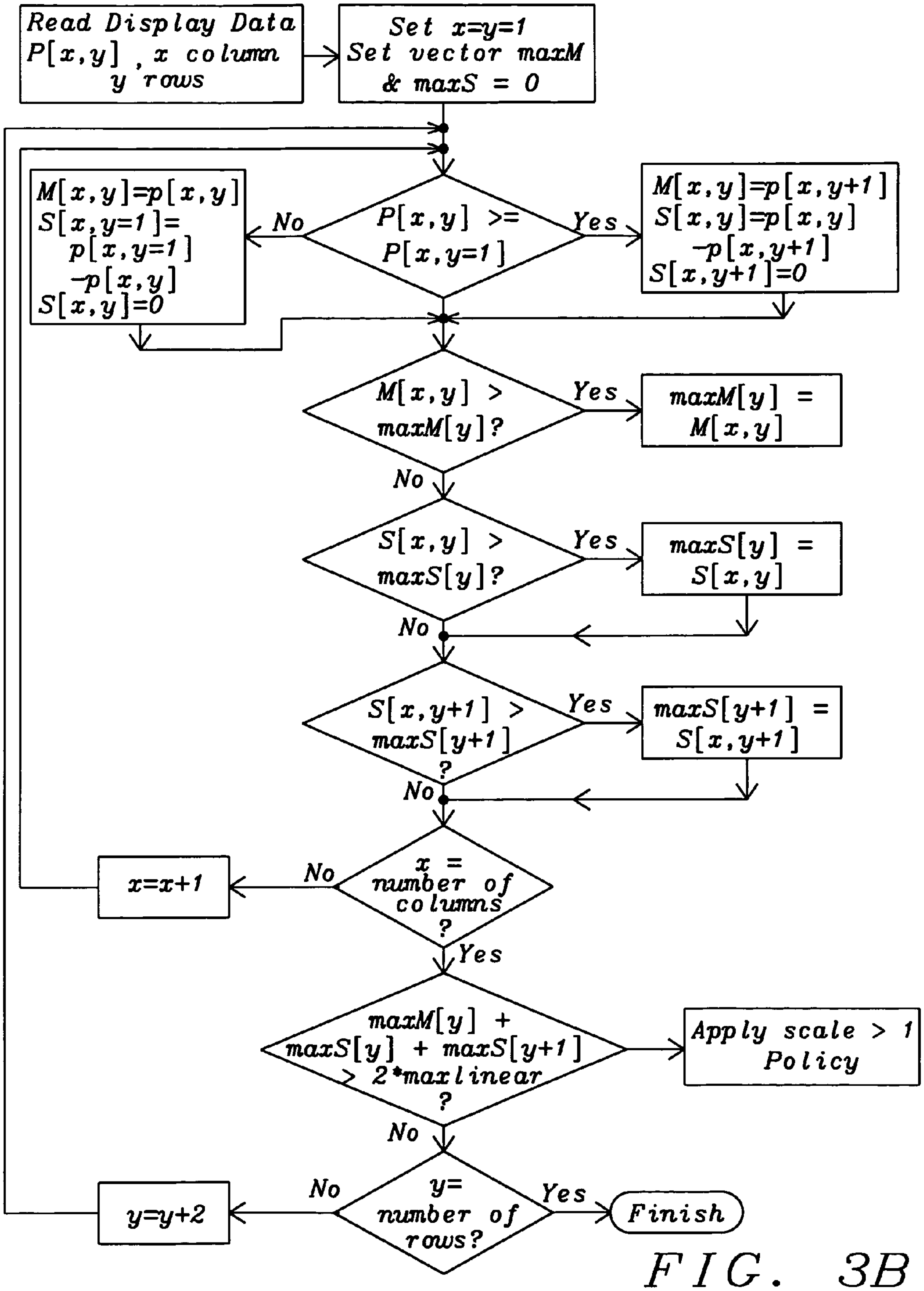
FIG. 3B shows a flow diagram for the AMLA scheme comprising a calculation policy block for special cases, where the drive time in AMLA mode would exceed the corresponding drive time in conventional single line linear scan mode.
Figure 3C:
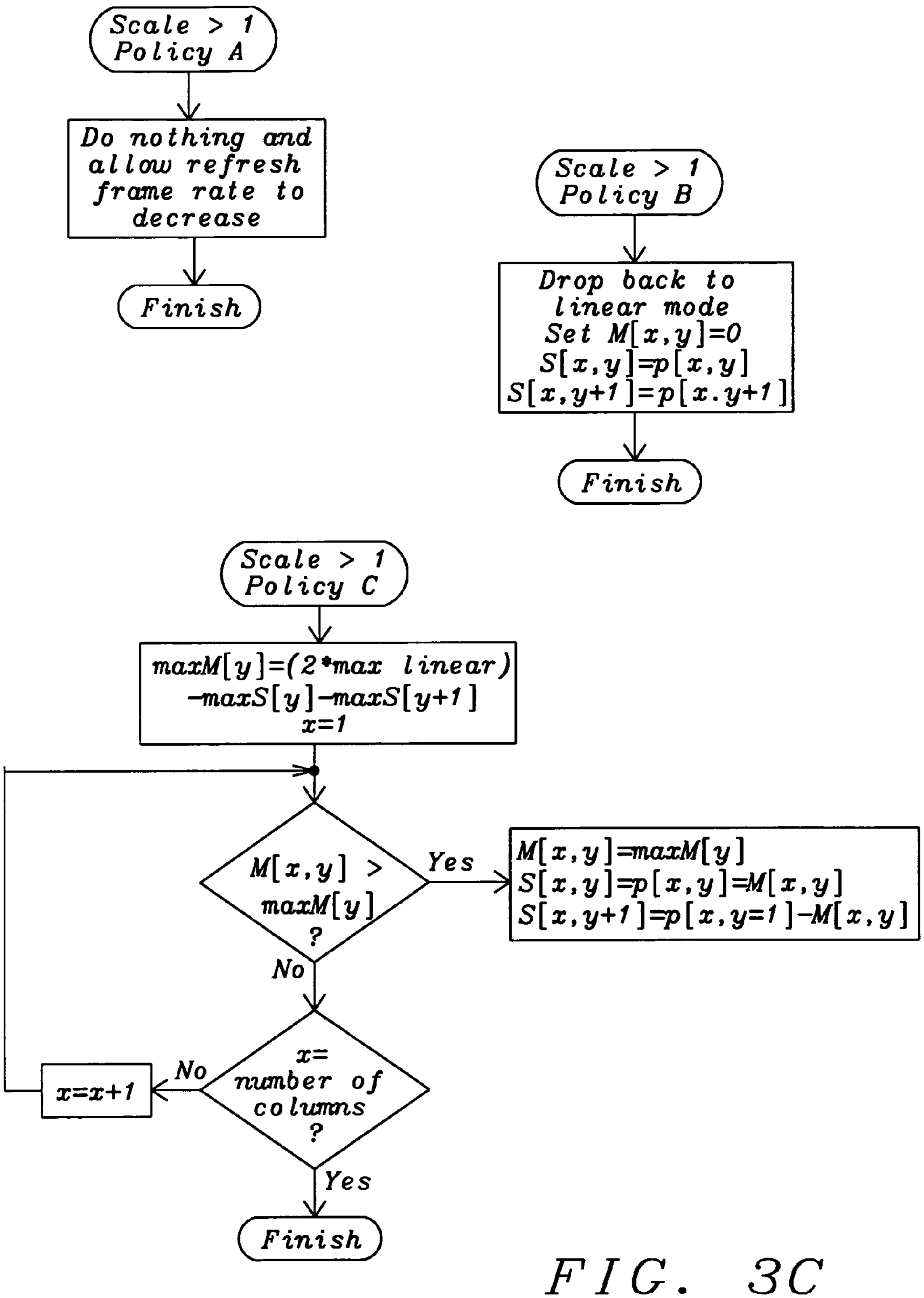
FIG. 3C shows three flow diagrams for policies A-C as part of the flow diagram for the AMLA scheme described in FIG. 3B.
Figure 3D:
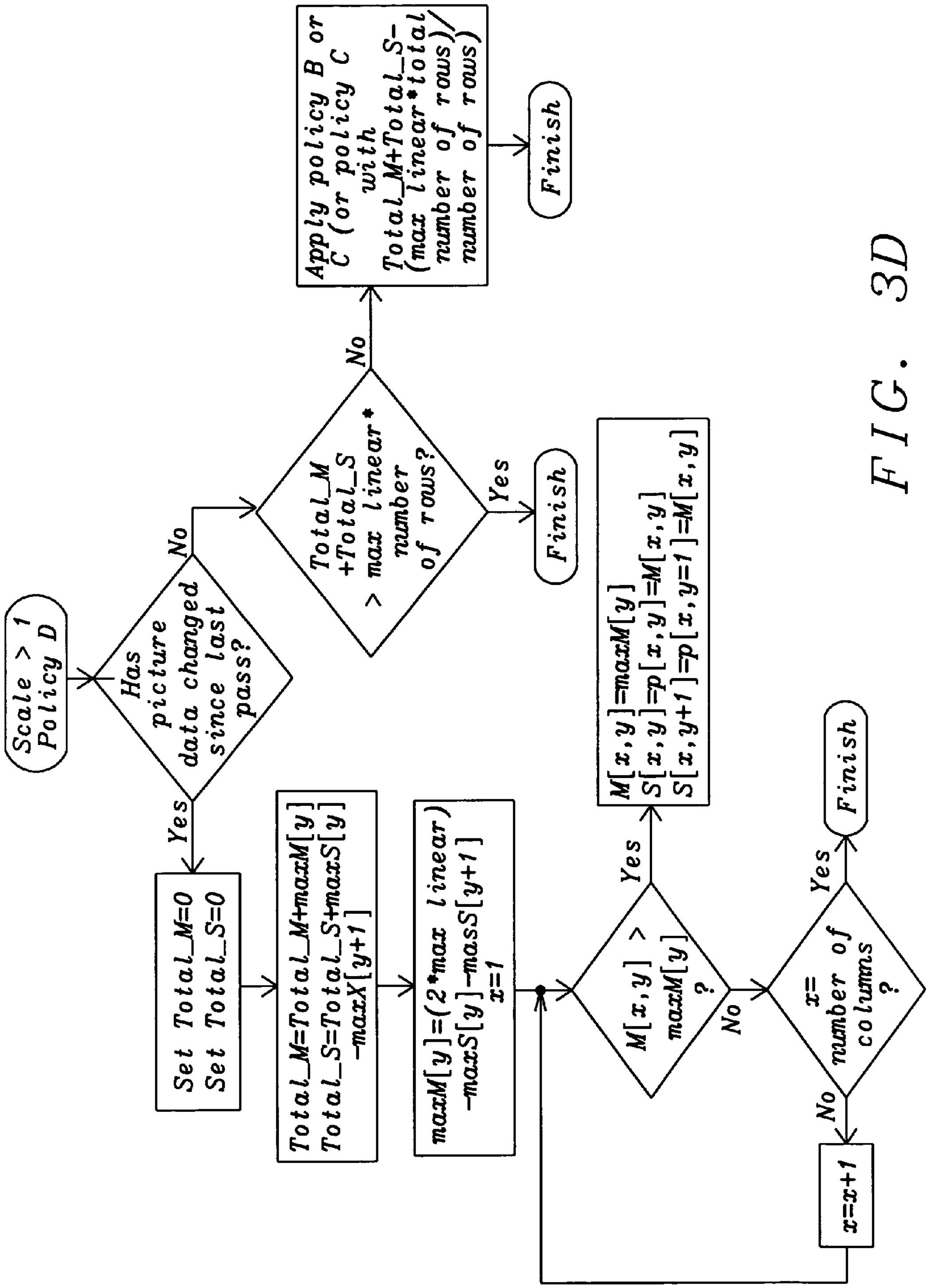
FIG. 3D shows a flow diagram for policy D as part of the flow diagram for the AMLA scheme described in FIG. 3B.

FIGS. 3B to 3D present flow diagrams for calculations as employed during preparation of the image data for the 'Advanced Multi Line Addressing' (AMLA) scheme. Image data are represented in normalized form as matrix P[x,y] comprising every pixel or sub-pixel p[x,y] within all X columns and Y rows, where X and Y designate the fixed numbers of columns and rows of the FPD, and x and y designate the coordinates of the pixel or sub-pixel position in the pixel matrix. The matrices M[x,y] and S[x,y] contain the image data for the multi line data domain M and the single line data domain S, as introduced above. There are further two auxiliary variables maxM[y] and maxS[y] as vectors, whereby maxM[y] and maxS[y] are vectors temporarily storing the maximum of the pixel's image data values in the respective domain currently evaluated when comparing two rows for each row, and sequentially evaluated within the algorithm for each pixel of a column. In order to decide for the application of special cases or policies in case where the drive time for the multi line driving from the M domain and the single line driving from the S domain for two rows sums up to a value greater than the drive time for two single lines in conventional linear scan mode, a value max_linear as constant is needed, containing the figure for the time needed in regular linear scan mode of one row. These cases are handled in a separate block in the flow diagram from FIG. 3B named 'Apply Scale>1 Policy' and separately described in FIGS. 3C and 3D by the help of appropriate flow diagrams. The decision on 'Scale>1' stems from the terminology 'scaling factor' used in describing such pictures with according raw image data not allowing to fit the AMLA drive time results in the drive time schedule mentioned before, which are then grouped into four different cases respectively named as Policy A to Policy D. Following the rules and prescriptions given in the steps of the flow diagrams shown in FIGS. 3B-3D it is clearly understandable, that the AMLA algorithm is defined sufficiently for an implementation.

Only one single pass through the image data of one frame or sub-frame is required during the processing of the AMLA algorithm, in contrast to CMLA which requires a minimum of three passes through the data.

Figure 4A:
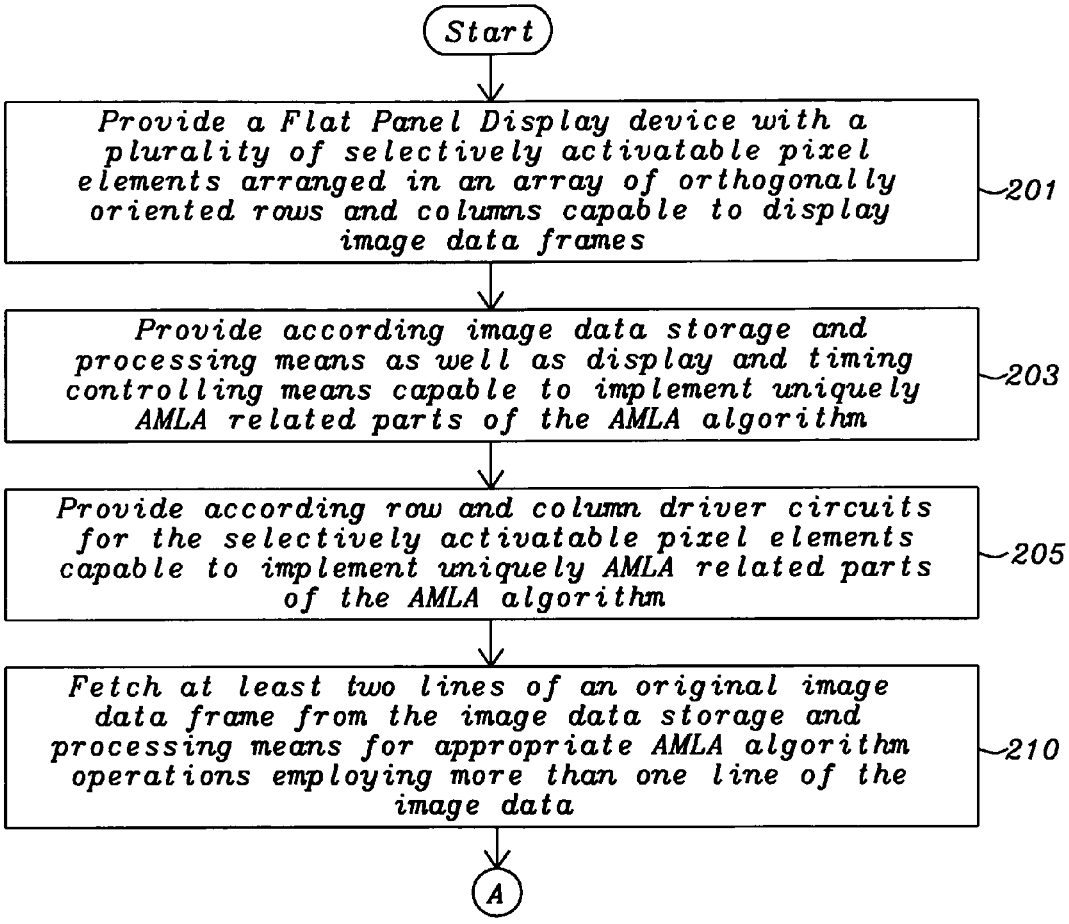
FIGS. 4A-4C describe with the help of a flow diagram that new 'Advanced Multi Line Addressing' (AMLA) scheme as shown in FIGS. 3A to 3D according to the current invention and described in the specification in more detail.
Figure 4B:
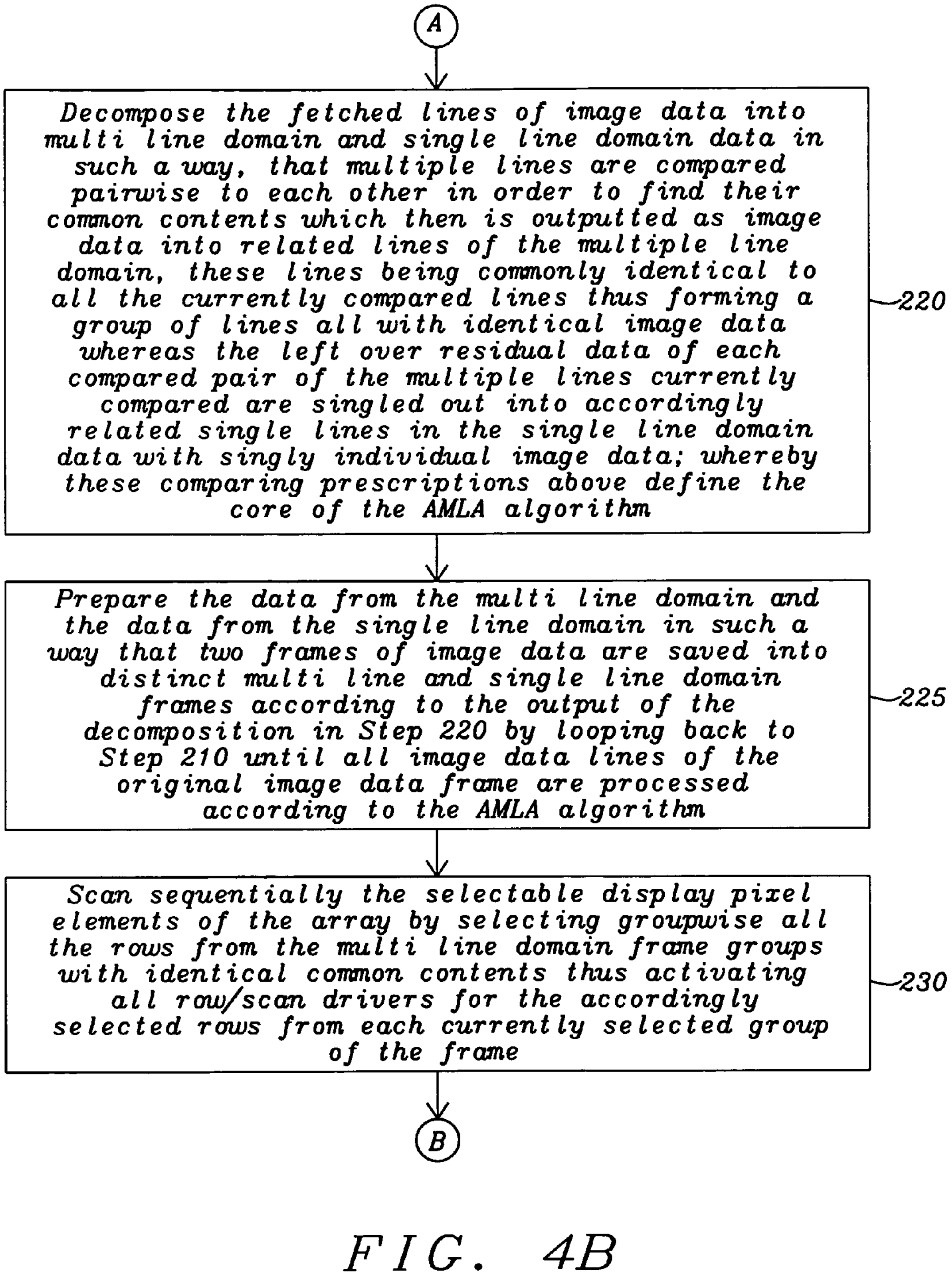
Figure 4C:
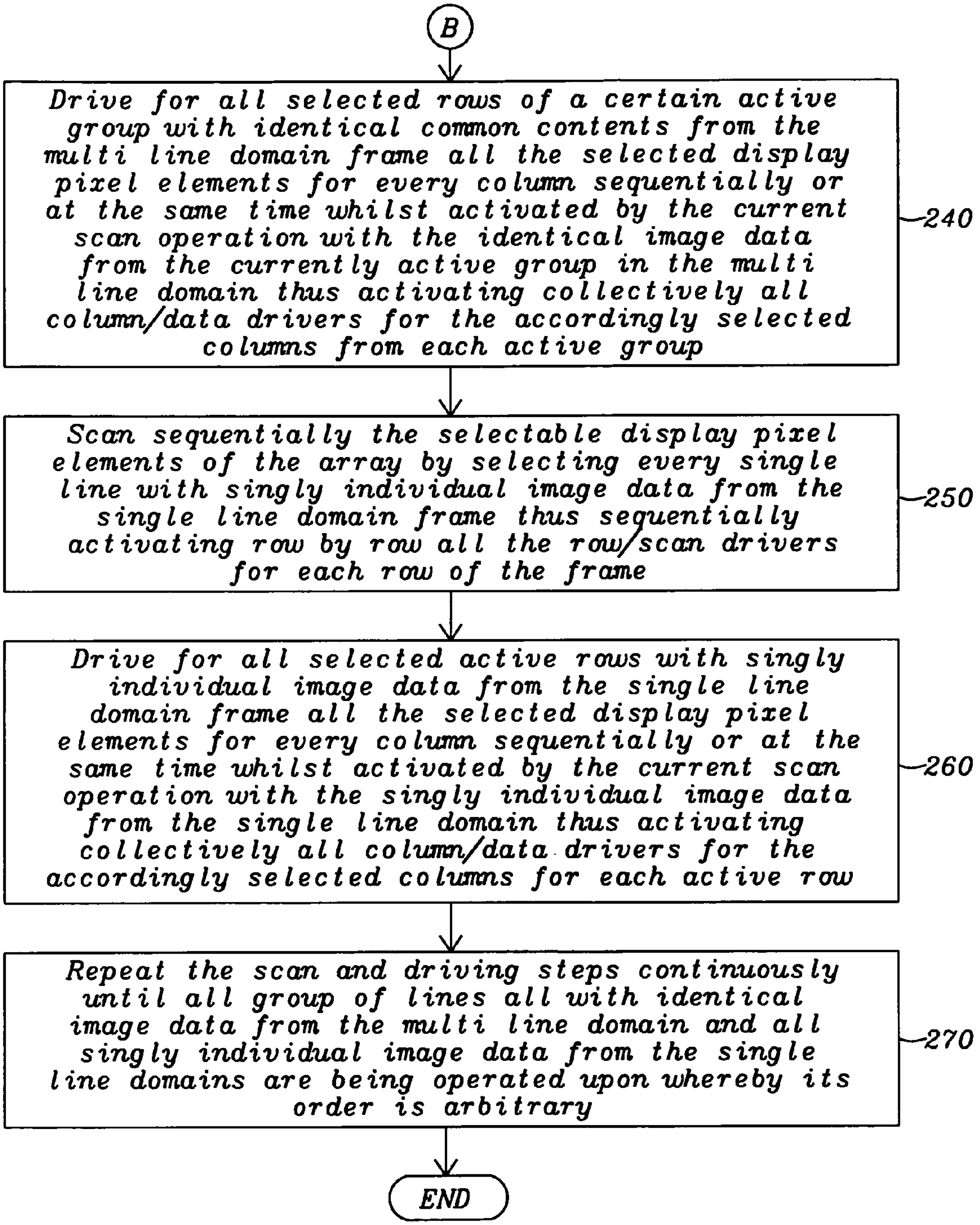

Regarding the flow diagram given by FIGS. 4A-4C the method for implementing an 'Advanced Multi Line Addressing' (AMLA) scheme for Flat Panel Display devices according to the invention and as illustrated by FIGS. 3A-3D is now defined and described by its steps, wherein the first steps 201-205 provide a Flat Panel Display with a plurality of selectable pixel elements arranged in an array of orthogonally oriented rows and columns and the according row and column driver circuits for said selectable pixel elements, provide according image data storage and processing means as well as display and timing controlling means capable to implement uniquely AMLA related parts of the AMLA algorithm, and provide according row and column driver circuits for the selectively activatable pixel elements capable to implement uniquely AMLA related parts of the AMLA algorithm. Step 210 fetches at least two lines of an original image data frame from the image data storage and processing means for appropriate AMLA algorithm operations employing more than one line of the image data and Step 220 decomposes the fetched lines of image data into multi line domain and single line domain data in such a way, that multiple lines are compared pairwise to each other in order to find their common contents which then is outputted as image data into related lines of the multiple line domain, these lines being commonly identical to all the currently compared lines thus forming a group of lines all with identical image data whereas the left over residual data of each compared pair of the multiple lines currently compared are singled out into accordingly related single lines in the single line domain data with singly individual image data; whereby these comparing prescriptions above define the core of the AMLA algorithm. Step 225 prepares the data from the multi line domain and the data from the single line domain in such a way that two frames of image data are saved into distinct multi line and single line domain frames according to the output of the decomposition in Step 220 by looping back to Step 210 until all image data lines of the original image data frame are processed according to the AMLA algorithm. Steps 230 and 240 are both handling the multi line domain data namely scanning sequentially the selectable display pixel elements of the array by selecting groupwise all the rows from the multi line domain frame groups with identical common contents thus activating all row/scan drivers for the accordingly selected rows from each currently selected group of the frame and then driving for all selected rows of a certain active group with identical common contents from the multi line domain frame all the selected display pixel elements for every column sequentially or at the same time whilst activated by the current scan operation with the identical image data from the currently active group in the multi line domain thus activating collectively all column/data drivers for the accordingly selected columns from each active group. In a comparable way Steps 250 and 260 are both handling the single line domain data, namely scanning sequentially the selectable display pixel elements of the array by selecting every single line with singly individual image data from the single line domain frame thus sequentially activating row by row all the row/scan drivers for each row of the frame and then driving for all selected active rows with singly individual image data from the single line domain frame all the selected display pixel elements for every column sequentially or at the same time whilst activated by the current scan operation with the singly individual image data from the single line domain thus activating collectively all column/data drivers for the accordingly selected columns for each active row. Finally Step 270 is repeating the scan and driving steps continuously until all the groups of lines all with identical image data from the multi line domain and all singly individual image data from the single line domain are being operated upon whereby its order is arbitrary.

Figure 5A:
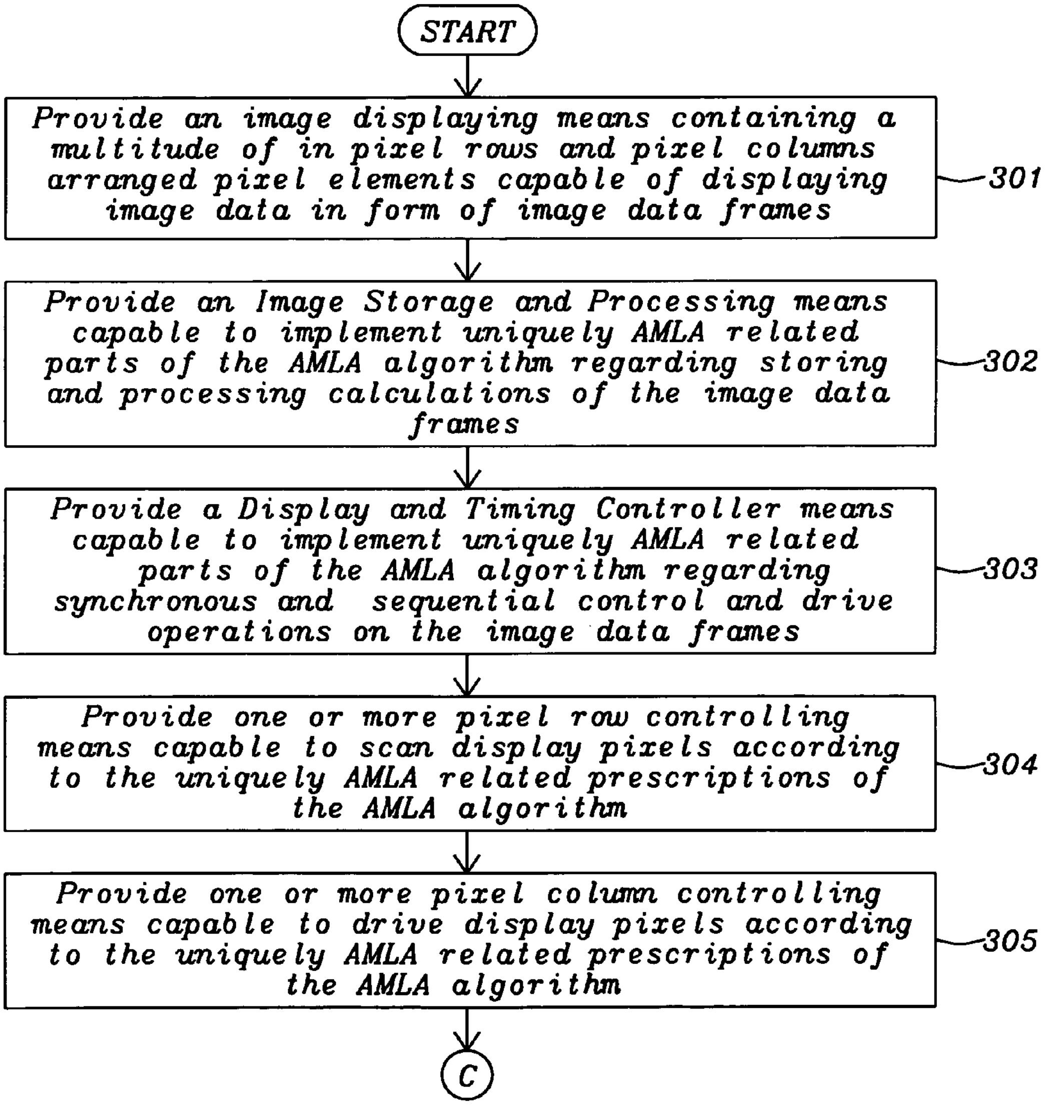
FIGS. 5A-5C describe again with the help of a flow diagram the application of this new method teached in the current invention and called 'Advanced Multi Line Addressing' (AMLA) scheme as described and explained by FIGS. 3A to 3D, thus allowing substantial power savings for FPD devices equipped with the AMLA method.
Figure 5B:
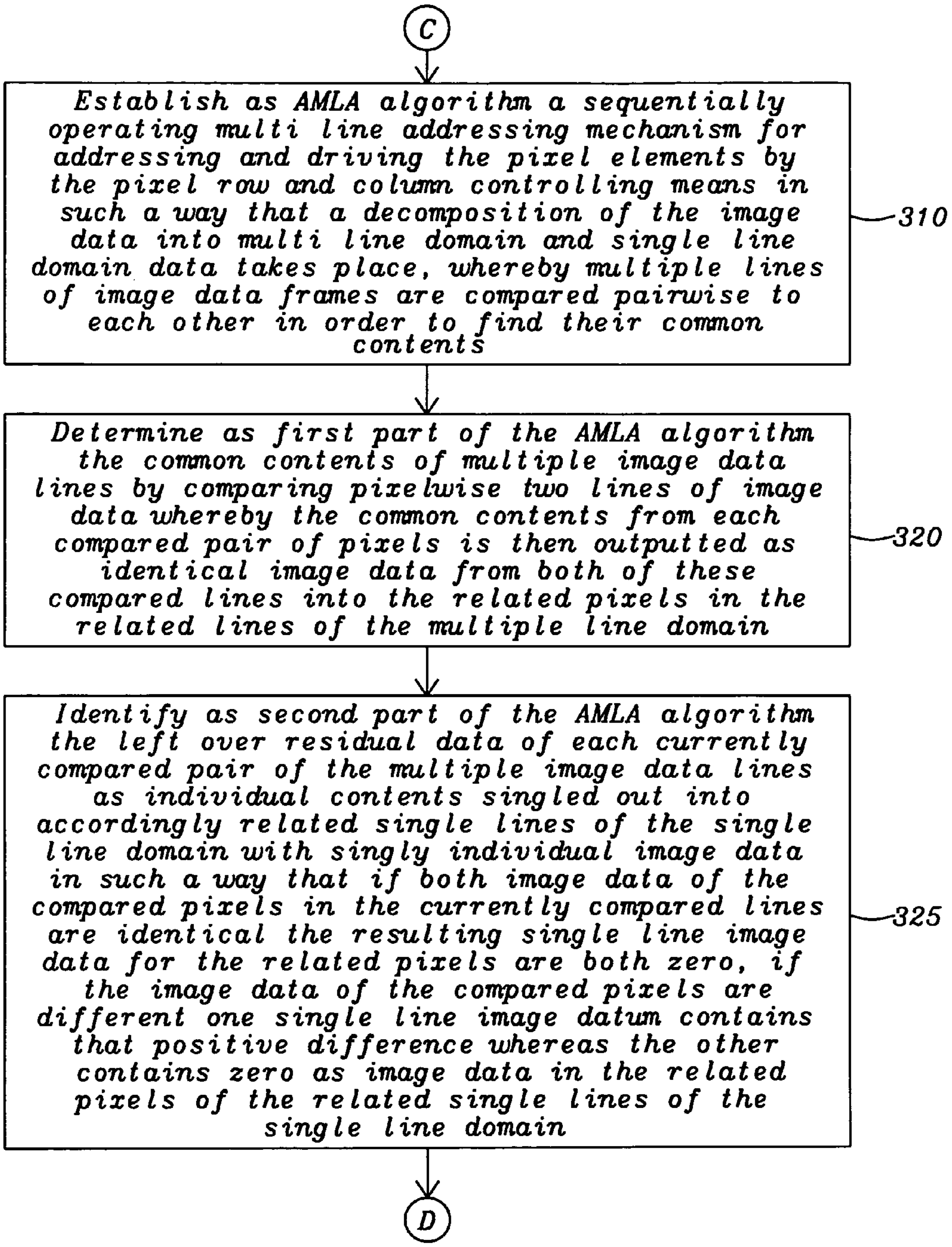
Figure 5C:
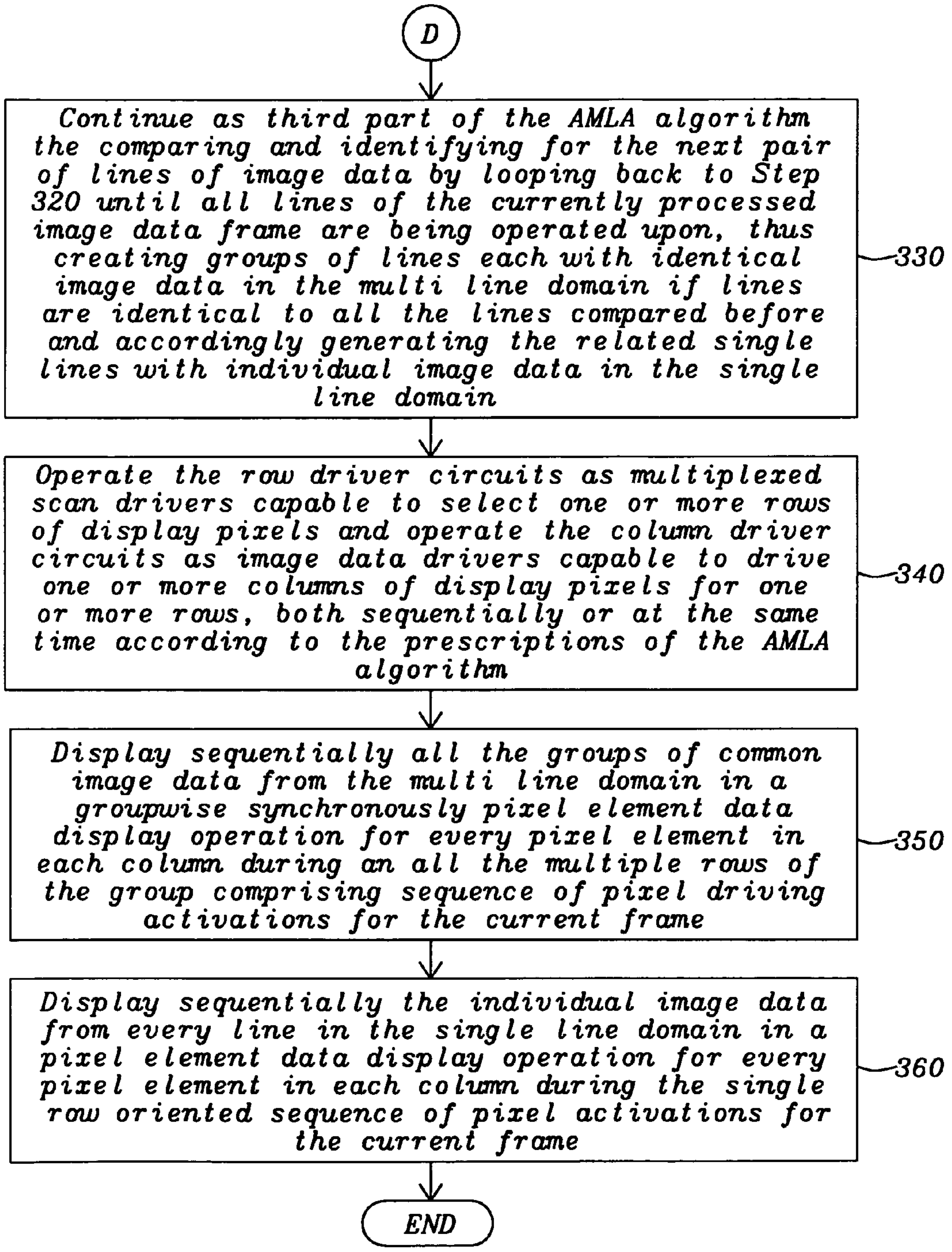

Regarding the flow diagram given by FIGS. 5A-5B the method for implementing an 'Advanced Multi Line Addressing' scheme for Flat Panel Display devices according to the invention and illustrated by FIGS. 3A-3D is now described in a different manner by the following steps, wherein the first steps 301-305 provide an image displaying means containing a multitude of in pixel rows and pixel columns arranged pixel elements capable of displaying image data in form of image data frames, an Image Storage and Processing means capable to implement uniquely AMLA related parts of the AMLA algorithm regarding storing and processing calculations of the image data frames, a Display and Timing Controller means capable to implement uniquely AMLA related parts of the AMLA algorithm regarding synchronous and sequential control and drive operations on the image data frames, one or more pixel row controlling means capable to scan display pixels according to the uniquely AMLA related prescriptions of the AMLA algorithm, and one or more pixel column controlling means capable to drive display pixels according to the uniquely AMLA related prescriptions of the AMLA algorithm. With Step 310 the AMLA algorithm is established as a sequentially operating multi line addressing mechanism for addressing and driving the pixel elements by the pixel row and column controlling means in such a way that a decomposition of the image data into multi line domain and single line domain data takes place, whereby multiple lines of image data frames are compared pairwise to each other in order to find their common contents. Step 320 determines as first part of the AMLA algorithm the common contents of multiple image data lines by comparing pixelwise two lines of image data whereby the common contents from each compared pair of pixels is then outputted as identical image data from both of these compared lines into the related pixels in the related lines of the multiple line domain, whereby in Step 325 as second part of the AMLA algorithm the left over residual data of each currently compared pair of the multiple image data lines are identified as individual contents singled out into accordingly related single lines of the single line domain with singly individual image data in such a way that if both image data of the compared pixels in the currently compared lines are identical the resulting single line image data for the related pixels are both zero, if the image data of the compared pixels are different one single line image datum contains that positive difference whereas the other contains zero as image data in the related pixels of the related single lines of the single line domain. Step 330 continues as third part of the AMLA algorithm the comparing and identifying for the next pair of lines of image data by looping back to Step 320 until all lines of the currently processed image data frame are being operated upon, thus creating groups of lines each with identical image data in the multi line domain if lines are identical to all the lines compared before and accordingly generating the related single lines with individual image data in the single line domain. Step 340 operates the row driver circuits as multiplexed scan drivers capable to select one or more rows of display pixels and also operates the column driver circuits as image data drivers capable to drive one or more columns of display pixels for one or more rows, both sequentially or at the same time according to the prescriptions of the AMLA algorithm. Finally Step 350 displays sequentially all the groups of common image data from the multi line domain in a groupwise synchronously pixel element data display operation for every pixel element in each column during an all the multiple rows of the group comprising sequence of pixel driving activations for the current frame and Step 360 displays sequentially the individual image data from every line in the single line domain in a pixel element data display operation for every pixel element in each column during the single row oriented sequence of pixel activations for the current frame.

It shall be mentioned here that the term frame may be replaced by the term sub-frame everywhere in the two descriptions of the AMLA algorithms and methods above, also should be mentioned that the order in which these frames or sub-frames with single line domain and multi line domain data are displayed is arbitrary. Furthermore shall be mentioned that the display of the frames or sub-frames with multi line domain and single line domain data may be done in such a way, that appropriate parts of either domains are interleaved with each other, i.e. there is no prescription to fully display all data from one domain collectively and all at once.

It is understood that the proposed embodiment with components as particularly shown here, and described and explained above is chosen only as a demonstration for the teachings and ideas of this invention. The teachings and ideas of the proposed schemes and methods can therefore also be applied to circuits with varying components, and also to circuits with other transistor technologies. Several hints and remarks to this conclusion have already been given above.

The current invention has now been electrically and technologically described and explained in great detail. The manufacturing process for semiconductor realizations in MOS technology is especially suited for these type of larger current source arrays.

Summarizing the essential features of the realization of the circuit we find, that in integrated circuit embodiments of the present invention a novel circuit and method is implemented, able to provide an easy and power saving algorithm implemented which altogether results in better reliability and quality products.

As shown in the preferred embodiment the novel system, circuits and methods provide an effective and manufacturable alternative to the prior art.

Consequently, although only one typical embodiment of the present invention has been described in detail, it should be understood that the present invention may be embodied in many other specific forms without departing from the spirit or scope of the invention. Substitutions and variations on the inventive concepts are possible and are within the skills of one skilled in the art given this disclosure. In view of the foregoing, it should be apparent that the present examples are to be considered as illustrative and not restrictive, and the invention is not to be limited to the details given herein, but may be modified within the scope of the appended claims. While the invention has been particularly illustrated and described with reference to the preferred embodiment, it will be understood by those skilled in the art that various changes in form and details may be made without departing from the spirit and scope of the invention. Having shown and explained the principles of this invention with the aid of the given method it should also be readily apparent to those skilled in the art that the invention can be modified in arrangement and structure without departing from such principles. We therefore claim all modifications coming within the spirit and scope of the accompanying claims.

What is claimed is:

1. A circuit, realizing a flat panel display capable to display images, comprising:

an image storage and processing block for storing and processing said images to be displayed;

a display and timing controller block controlling said display operation;

an image pixel matrix containing a multitude of row- and column- line arranged pixel elements;

one or more controlled row driver blocks;

one or more controlled column driver blocks; and a pixel display operation for displaying said pixel elements employing an advanced multi-line addressing operation applied to a row and/or column drive activated pixel element display operation, whereby said advanced multi-line addressing operation comprises during every operating sequence lossless decomposition of image pixel data by analyzing image pixel data from multiple lines for common contents by image pixel data comparison using only pixel data calculation algorithms for said lossless decomposition operation of image pixel data which are requiring only one single pass through said image pixel data within one image frame period, thereby separating common parts of said image pixel data into a multi-line data domain and residual parts of the image pixel data into a single line data domain thus allowing for a display of these two data domains in separately activated pixel element display operations, wherein the lossless decomposition is performed by maximizing multi-line data in the multi-line data domain and minimizing single-line data in the single-line data domain within one image frame period.

2. The circuit according to claim 1 wherein said pixel display operation for displaying said pixel elements is a sequentially operating pixel display operation for displaying said pixel elements employing an advanced multi-line addressing operation applied to a row and/or column drive activated sequential pixel element display operation.

3. The circuit according to claim 1 whereby said advanced multi-line addressing operation signifies that during every operating sequence a decomposition operation of said image pixel data is taking place by analyzing image pixel data from multiple lines for common contents by simple pixel data comparison, separating the common parts of said image pixel data into a multi-line data domain and the residual parts of the image pixel data into a single line data domain thus allowing for a separate display of the two data domains immediately following each other in separately activated sequential pixel element display operations.

4. The circuit according to claim 1 whereby said advanced multi-line addressing operation signifies that during every operating sequence a decomposition operation of said image pixel data is taking place by analyzing said image pixel data from multiple lines for common contents by simple pixel data comparison, separating the common parts of said image pixel data into a multi-line data domain and the residual parts of said image pixel data into a single line data domain thus allowing for an interleaved display of the two data domains each with separately activated sequential pixel element display operations.

5. The circuit according to claim 1 wherein said image pixel matrix comprises a passive matrix device.

6. The circuit according to claim 1 wherein said image pixel matrix comprises an active matrix device.

7. The circuit according to claim 1 wherein said image storage and/or processing block comprises memory for more than one image frame.

8. The circuit according to claim 1 wherein said image storage and/or processing block comprises memory for only one single image frame.

9. The circuit according to claim 1 wherein said image storage and/or processing block comprises memory for a partial image frame only.

10. The circuit according to claim 1 wherein said image storage and/or processing block comprises a digital processor.

11. The circuit according to claim 10 wherein said digital processor comprises an ASIC device.

12. The circuit according to claim 10 wherein said digital processor comprises an FPGA device.

13. The circuit according to claim 10 wherein said digital processor comprises a general purpose CPU and memory.

14. The circuit according to claim 13 wherein said memory comprises RAM.

15. The circuit according to claim 13 wherein said memory comprises ROM.

16. The circuit according to claim 1 wherein the components of said blocks are MOSFET components.

17. The circuit according to claim 16 wherein said MOSFET components are of the CMOS type.

18. The circuit according to claim 1 wherein said pixel elements comprise LEDs.

19. The circuit according to claim 18 wherein said LEDs comprise OLEDs.

20. The circuit according to claim 18 wherein said LEDs comprise PLEDs.

21. A circuit, realizing a flat panel display capable to display images, comprising:

an image storage and processing means;

a display and timing controller means;

an image displaying means containing a multitude of row- and column- line arranged pixel elements;

one or more row controlling means;

one or more column controlling means; and a pixel display operation for displaying said pixel elements employing an advanced multi-line addressing operation applied to a row and/or column drive activated pixel element display operation, whereby said advanced multi-line addressing operation comprises during every operating sequence lossless decomposition of image pixel data by analyzing image pixel data from multiple lines for common contents by image pixel data comparison using only image pixel data calculation algorithms for said lossless decomposition operation of image pixel data which are requiring only one single pass through said image pixel data within one image frame period, thereby separating common parts of said image pixel data into a multi-line data domain and residual parts of said image pixel data into a single line data domain thus allowing for a display of the two data domains in separately activated pixel element display operations, wherein the lossless decomposition is performed by maximizing multi-line data in the multi-line data domain and minimizing single-line data in the single-line data domain within one image frame period.

22. The circuit according to claim 21 wherein said pixel display operation for displaying said pixel elements is a sequentially operating pixel display operation for displaying said pixel elements employing an advanced multi-line addressing operation applied to a row and/or column drive activated sequential pixel element display operation.

23. The circuit according to claim 21 whereby said advanced multi-line addressing operation signifies that during every operating sequence a decomposition operation of said image pixel data is taking place by analyzing said image pixel data from multiple lines for common contents by simple pixel data comparison, separating the common parts of said image pixel data into a multi-line data domain and the residual parts of said image pixel data into a single line data domain thus allowing for a separate display of the two data domains immediately following each other in separately activated sequential pixel element display operations.

24. The circuit according to claim 21 whereby said advanced multi-line addressing operation signifies that during every operating sequence a decomposition operation of said image pixel data is taking place by analyzing said image pixel data from multiple lines for common contents by simple pixel data comparison, separating the common parts of said image pixel data into a multi-line data domain and the residual parts of said image pixel data into a single line data domain thus allowing for an interleaved display of the two data domains each with separately activated sequential pixel element display operations.

25. A method for implementing a power saving advanced multi-line addressing algorithm for panel display drivers, comprising:

providing a flat panel display device with a plurality of selectively activatable pixel elements arranged in an array of orthogonally oriented rows and columns capable to display image data frames;

providing according image data storage and processing means as well as display and timing controlling means;

providing according row and column driver circuits for the selectively activatable pixel elements;

fetching at least two lines of an original image data frame from the image data storage and processing means for appropriate advanced multi-line addressing algorithm operations employing more than one line of the image data;

decomposing losslessly the fetched lines of image data into multi-line domain and single line domain data in such a way, that multiple lines are compared pairwise to each other in order to find their common contents which then is outputted as image data into related lines of the multiple line domain, these lines being commonly identical to all the currently compared lines thus forming a group of lines all with identical image data whereas the left over residual data of each compared pair of the multiple lines currently compared are singled out into accordingly related single lines in the single line domain data with singly individual image data; whereby these comparing prescriptions above define the core of the advanced multi-line addressing algorithm using only image pixel data calculation algorithms for said decomposition operation of image pixel data which are requiring only one single pass through said image pixel data within one image frame period, wherein the lossless decomposition is performed by maximizing multi-line data in the multi-line data domain and minimizing single-line data in the single-line data domain within one image frame period;

preparing the data from the multi-line domain and the data from the single line domain in such a way that two frames of image data are saved into distinct multi-line and single line domain frames according to the output of the decomposition in step ‘decomposing’ above by looping back to step ‘fetching’ above until all image data lines of the original image data frame are processed according to the advanced multi-line addressing algorithm;

scanning sequentially the selectable display pixel elements of the array by selecting groupwise all the rows from the multi-line domain frame groups with identical common contents thus activating all row/scan drivers for the accordingly selected rows from each currently selected group of the frame;

driving for all selected rows of a certain active group with identical common contents from the multi-line domain frame all the selected display pixel elements for every column sequentially or at the same time whilst activated by the current scan operation with the identical image data from the currently active group in the multi-line domain thus activating collectively all column/data drivers for the accordingly selected columns from each active group;

scanning sequentially the selectable display pixel elements of the array by selecting every single line with singly individual image data from the single line domain frame thus sequentially activating row by row all the row/scan drivers for each row of the frame;

driving for all selected active rows with singly individual image data from the single line domain frame all the selected display pixel elements for every column sequentially or at the same time whilst activated by the current scan operation with the singly individual image data from the single line domain thus activating collectively all column/data drivers for the accordingly selected columns for each active row; and repeating all the 'scanning' and 'driving' steps above continuously until all group of lines all with identical image data from the multi-line domain and all singly individual image data from the single line domain are being operated upon whereby its order is arbitrary.

26. The method according to claim 25 wherein said step of decomposing comprises a decision operation accounting for special cases or policies where the drive time for the multi-line driving from the M domain and the single line driving from the S domain for two rows sums up to a value greater than the drive time for two single lines in conventional linear scan mode.

27. The method according to claim 25 whereby said steps of driving all the selected display pixel elements for every column are completed until all image data of either domain are displayed.

28. The method according to claim 25 whereby said steps of driving all the selected display pixel elements for every column are realized in such a way, that image data from either domain are appropriately interleaved and displayed.

29. A method for implementing an advanced multi-line addressing algorithm for flat panel displays comprising:

providing an image displaying means containing a multitude of in pixel rows and pixel columns arranged pixel elements capable of displaying image data in form of image data frames;

providing an image storage and processing means capable to implement uniquely advanced multi-line addressing algorithm related parts regarding storing and processing calculations of the image data frames;

providing a display and timing controller means capable to implement uniquely advanced multi-line addressing algorithm related parts regarding synchronous and sequential control and drive operations on the image data frames;

providing one or more pixel row controlling means capable to scan display pixels according to the uniquely advanced multi-line addressing algorithm related prescriptions;

providing one or more pixel column controlling means capable to drive display pixels according to the uniquely advanced multi-line addressing algorithm related prescriptions;

establishing as advanced multi-line addressing algorithm a sequentially operating multi-line addressing mechanism for addressing and driving the pixel elements by the pixel row and column controlling means in such a way that a lossless decomposition of the image data into multi-line domain and single line domain data takes place using only image pixel data calculation algorithms for said lossless decomposition operation of image pixel data which are requiring only one single pass through said image pixel data, whereby multiple lines of image data frames are compared pairwise to each other in order to find their common contents, wherein the lossless decomposition is performed by maximizing multi-line data in the multi-line data domain and minimizing single-line data in the single-line data domain within one image frame period;

determining as first part of the advanced multi-line addressing algorithm the common contents of multiple image data lines by comparing pixelwise two lines of image data whereby the common contents from each compared pair of pixels is then outputted as identical image data from both of these compared lines into the related pixels in the related lines of the multiple line domain;

identifying as second part of the advanced multi-line addressing algorithm the left over residual data of each currently compared pair of the multiple image data lines as individual contents singled out into accordingly related single lines of the single line domain with singly individual image data in such a way that if both image data of the compared pixels in the currently compared lines are identical the resulting single line image data for the related pixels are both zero, if the image data of the compared pixels are different one single line image datum contains that positive difference whereas the other contains zero as image data in the related pixels of the related single lines of the single line domain;

continuing as third part of the advanced multi-line addressing algorithm the comparing and identifying for the next pair of lines of image data by looping back to step 'determining' above until all lines of the currently processed image data frame are being operated upon, thus creating groups of lines each with identical image data in the multi-line domain if lines are identical to all the lines compared before and accordingly generating the related single lines with individual image data in the single line domain;

operating the row driver circuits as multiplexed scan drivers capable to select one or more rows of display pixels and operate the column driver circuits as image data drivers capable to drive one or more columns of display pixels for one or more rows, both sequentially or at the same time according to the prescriptions of the advanced multi-line addressing algorithm;

displaying groups of common image data from the multi-line domain in a groupwise synchronously pixel element data display operation for every pixel element in each column during the pixel driving activations for the current frame; and displaying individual image data in the single line domain in a pixel element data display operation for pixel elements in each column during the pixel driving activations for the current frame.

30. The method according to claim 29 wherein said step of groups of common image data from the multi-line domain is a step of displaying sequentially all the groups of common image data from the multi-line domain in a groupwise synchronously pixel element data display operation for every pixel element in each column during an all the multiple rows of the group comprising sequence of pixel driving activations for the current frame.

31. The method according to claim 29 wherein said step of displaying individual image data in the single line domain is a step of displaying sequentially the individual image data from every line in the single line domain in a pixel element data display operation for every pixel element in each column during the single row oriented sequence of pixel activations for the current frame.

32. The method according to claim 29 wherein said two steps of displaying groups of common image data from the multi-line domain and of displaying individual image data in the single line domain are combined into one step where the operations of each original step are being interleaved appropriately.

33. A method for implementing a power saving advanced multi-line addressing algorithm for panel display drivers, comprising:

providing a flat panel display device with row and column driver circuits comprising according image data storage and processing means as well as display and timing controlling means;

decomposing losslessly lines of image data into multi-line domain and single line domain data in such a way, that multiple lines are compared pairwise to each other in order to find their common contents which then is outputted as image data into related lines of the multiple line domain, these lines being commonly identical to all the currently compared lines thus forming a group of lines all with identical image data whereas the left over residual data of each compared pair of the multiple lines currently compared are singled out into accordingly related single lines in the single line domain data with singly individual image data; whereby these comparing prescriptions above define the core of the advanced multi-line addressing algorithm using only image pixel data calculation algorithms for said decomposition operation of image pixel data which are requiring only one single pass through said image pixel data, wherein the lossless decomposition is performed by maximizing multi-line data in the multi-line data domain and minimizing single-line data in the single-line data domain within one image frame period.

34. A method for implementing an advanced multi-line addressing algorithm for flat panel displays comprising:

providing image displaying means with pixel and column row controlling means and image storage and processing means as well as display and timing controller means;

establishing as advanced multi-line addressing algorithm a sequentially. operating multi-line addressing mechanism for addressing and driving the pixel elements by the pixel row and column controlling means in such a way that a lossless decomposition of the image pixel data into multi-line domain and single line domain data is accomplished using only image pixel data calculation algorithms for said decomposition operation of image pixel data which are requiring only one single pass through said image pixel data, whereby multiple lines of image data are compared pairwise to each other in order to find their common contents which is then allotted to multi-line domain data whereas the residual contents collates into single line domain data, wherein the lossless decomposition is performed by maximizing multi-line data in the multi-line data domain and minimizing single-line data in the single-line data domain within one image frame period.

* * * * *